(12) United States Patent
Aiba et al.

(10) Patent No.: US 10,455,572 B2
(45) Date of Patent: Oct. 22, 2019

(54) MOBILE COMMUNICATION SYSTEM, BASE STATION APPARATUS, MOBILE STATION APPARATUS AND COMMUNICATION METHOD

(71) Applicant: GUANGDONG OPPO MOBILE TELECOMMUNICATIONS CORP., LTD., Dongguan (CN)

(72) Inventors: Tatsushi Aiba, Osaka (JP); Shoichi Suzuki, Osaka (JP); Toshizo Nogami, Osaka (JP)

(73) Assignee: Guangdong Oppo Mobile Telecommunications Corp., Ltd., Dongguan, Guangdong (CN)

( * ) Notice: Subject to any disclaimer, the term of this patent is extended or adjusted under 35 U.S.C. 154(b) by 0 days.

(21) Appl. No.: 15/959,231

(22) Filed: Apr. 22, 2018

(65) Prior Publication Data

US 2018/0242295 A1    Aug. 23, 2018

Related U.S. Application Data

(63) Continuation of application No. 15/189,793, filed on Jun. 22, 2016, now Pat. No. 9,955,471, which is a
(Continued)

(30) Foreign Application Priority Data

Mar. 19, 2010  (JP) ................................. 2010-064169

(51) Int. Cl.
*H04W 72/04* (2009.01)
*H04L 5/00* (2006.01)
(Continued)

(52) U.S. Cl.
CPC .......... *H04W 72/042* (2013.01); *H04L 5/001* (2013.01); *H04L 5/0053* (2013.01);
(Continued)

(58) Field of Classification Search
None
See application file for complete search history.

(56) References Cited

U.S. PATENT DOCUMENTS

| 8,509,161 B2 | 8/2013 | Imamura |
| 2010/0034152 A1 | 2/2010 | Imamura |

(Continued)

FOREIGN PATENT DOCUMENTS

| EP | 2326131 A1 | 5/2011 |
| JP | 2013-514713 A | 4/2013 |

(Continued)

OTHER PUBLICATIONS

"3rd Generation Partnership Project; Technical Specification Group Radio Access Network; Evolved Universal Terrestrial Radio Access (E-UTRA); Multiplexing and channel coding (Release 8)", 3GPP TS36.212 V8.7.0, (May 2009), pp. 1-60.

(Continued)

*Primary Examiner* — Eunsook Choi
(74) *Attorney, Agent, or Firm* — Finnegan, Henderson, Farabow Garrett & Dunner LLP

(57) ABSTRACT

A mobile station (MS) communicates with a base station (BS) by a carrier aggregation using a plurality of downlink component carriers (DCCs). The MS receives on one or more activated DCCs. The MS receives using a PDCCH on one of activated DCCs, from the BS, first information including an information field for requesting a transmission of channel state information (CSI), the first information being used for scheduling of a PUSCH. The MS transmits using the PUSCH in a first subframe on an uplink component carrier, to the BS, first CSI for more than one activated DCCs. The MS transmits using the PUSCH in a second subframe on the uplink component carrier, to the BS, second CSI for only one activated downlink component carrier. The transmission of the second CSI is scheduled by the first (Continued)

information received using the PDCCH on the only one activated downlink component carrier.

4 Claims, 21 Drawing Sheets

Related U.S. Application Data continuation of application No. 14/641,048, filed on Mar. 6, 2015, now Pat. No. 9,398,582, which is a continuation of application No. 13/635,760, filed as application No. PCT/JP2011/056357 on Mar. 17, 2011, now Pat. No. 9,008,021.

(51) Int. Cl.
*H04W 72/12* (2009.01)
*H04W 24/10* (2009.01)
*H04W 48/08* (2009.01)
*H04W 88/02* (2009.01)
*H04W 88/08* (2009.01)

(52) U.S. Cl.
CPC ........ *H04W 72/1289* (2013.01); *H04W 24/10* (2013.01); *H04W 48/08* (2013.01); *H04W 88/02* (2013.01); *H04W 88/08* (2013.01)

(56) References Cited

U.S. PATENT DOCUMENTS

| | | |
|---|---|---|
| 2010/0035625 A1 | 2/2010 | Damnjanovic et al. |
| 2010/0254329 A1 | 10/2010 | Pan et al. |
| 2011/0013581 A1 | 1/2011 | Lee et al. |
| 2011/0122825 A1 | 5/2011 | Lee et al. |
| 2011/0141941 A1 | 6/2011 | Lee et al. |
| 2011/0143796 A1 | 6/2011 | Lee et al. |
| 2011/0194514 A1 | 8/2011 | Lee et al. |
| 2011/0194516 A1 | 8/2011 | Aiba et al. |
| 2011/0317652 A1* | 12/2011 | Kim ........................ H04L 5/001 370/329 |
| 2012/0044894 A1 | 2/2012 | Ko et al. |
| 2012/0106450 A1 | 5/2012 | Golitschek Edler Von Elbwart et al. |
| 2012/0236813 A1 | 9/2012 | Tan |
| 2012/0269153 A1 | 10/2012 | Seo et al. |
| 2013/0003681 A1 | 1/2013 | Earnshaw et al. |
| 2013/0077585 A1 | 3/2013 | Pan et al. |
| 2013/0155969 A1 | 6/2013 | Moon et al. |
| 2013/0301588 A1 | 11/2013 | Imamura |

FOREIGN PATENT DOCUMENTS

| | | |
|---|---|---|
| WO | WO 2009/022820 A2 | 2/2009 |
| WO | WO 2010/011104 A2 | 1/2010 |
| WO | WO 2010/013963 A2 | 2/2010 |
| WO | WO 2010/013970 A2 | 2/2010 |
| WO | WO 2010/018854 A1 | 2/2010 |
| WO | WO 2010/027035 A1 | 3/2010 |
| WO | WO 2010/105255 A2 | 9/2010 |
| WO | WO 2011/074885 A2 | 6/2011 |

OTHER PUBLICATIONS

International Search Report for PCT/JP2011/056357 dated May 17, 2011.
Nokia Siemens Networks, Nokia, "Remaining Details of Carrier Indicator Field", 3GPP TSG RAN WG1 #60 Meeting, R1-101413, Feb. 22-26, 2010, 3 pages.
Alcatel-Lucent: "Component carrier indication for bandwidth extension in LTE-A", 3GPP Draft; R1-093362, 3GPP TSG-RAN WG1 #58, Shenzhen, China Aug. 24-28, 2009.
Supplementary European Search Report and Search Opinion issued in European Application No. 11756383.3, dated Apr. 5, 2016.
U.S. Notice of Allowance issued in U.S. Appl. No. 13/635,760 dated Dec. 9, 2014.
U.S. Office Action issued in U.S. Appl. No. 13/635,760 dated Jul. 3, 2014.
U.S. Notice of Allowance issued in U.S. Appl. No. 14/641,048 dated Mar. 15, 2016.
U.S. Office Action issued in U.S. Appl. No. 14/641,048 dated Oct. 8, 2015.
European Patent Application Examination Report dated Jun. 4, 2018, issued in counterpart European Patent Application No. 11 756 383.3.

* cited by examiner

FIG. 6

| DLCC | CQI reference resources |
|---|---|
| DLCC-0 | DLCC-0 |
| DLCC-1 | DLCC-2 |
| DLCC-2 | DLCC-1 |

FIG.8
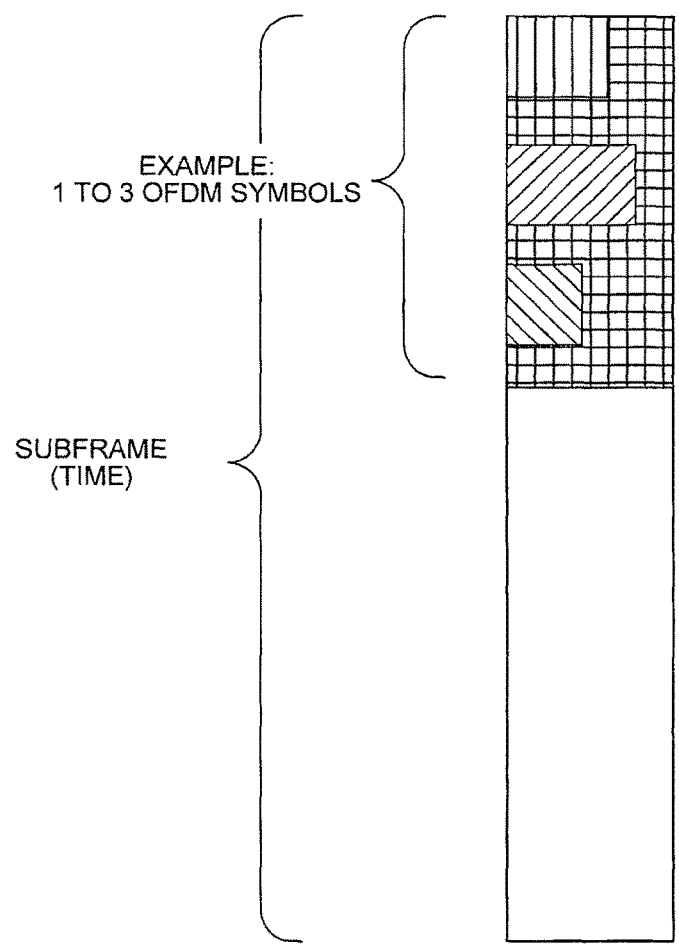
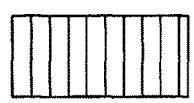 SS-0
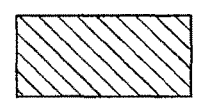 SS-2
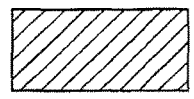 SS-1
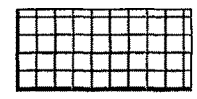 PDCCH RESOURCE (PDCCH RESOURCE REGION)

FIG.9

| SS (Search Space) | CQI reference resource |
|---|---|
| SS-0 | DLCC-0 |
| SS-1 | DLCC-2 |
| SS-2 | DLCC-1 |

FIG.11

| PAIR (INDEX) | DLCC | ULCC |
|---|---|---|
| 0 | DLCC-0 | ULCC-0 |
| 1 | DLCC-1 | ULCC-1 |
| 2 | DLCC-2 | ULCC-1 |

FIG.15

| SS (Search Space) | CIF |
|---|---|
| CSS | NON-EXISTENT |
| USS | NON-EXISTENT OR EXISTENT |

MOBILE COMMUNICATION SYSTEM, BASE STATION APPARATUS, MOBILE STATION APPARATUS AND COMMUNICATION METHOD

This application is a Continuation of U.S. application Ser. No. 15/189,793, filed Jun. 22, 2016, which is a Continuation of U.S. application Ser. No. 14/641,048, filed on Mar. 6, 2015, issued as U.S. Pat. No. 9,398,582 on Jul. 19, 2016, which is a Continuation of U.S. application Ser. No. 13/635,760, filed on Oct. 31, 2012, issued as U.S. Pat. No. 9,008,021 on Apr. 14, 2015, which was filed as PCT International Application No. PCT/JP2011/056357 on Mar. 17, 2011, which claims the benefit under 35 U.S.C. § 119(a) to Patent Application No. 2010-064169, filed in Japan on Mar. 19, 2010, all of which are hereby expressly incorporated by reference into the present application in their entirety.

TECHNICAL FIELD

The present invention relates to a mobile communication system, a base station apparatus, a mobile station apparatus, and a communication method.

BACKGROUND ART

In the 3rd Generation Partnership Project (3GPP), utilizing a radio access system and evolution of radio network of cellular mobile communication (referred to as "LongTerm Evolution (LTE)" or "Evolved Universal Terrestrial Radio Access (EUTRA)" in the following), and a wider frequency band, a radio access system and radio network are under consideration which realize faster data communication (referred to as "Long Term Evolution-Advanced (LTE-A, A-LTE)" or "Advanced Evolved Universal Terrestrial Radio Access (A-EUTRA)" in the following).

In LTE, as a downlink (radio communication from a base station apparatus to a mobile station apparatus), Orthogonal Frequency Division Multiplexing (OFDM) method is used, which is multi-carrier transmission. In addition, as an uplink (radio communication from a mobile station apparatus to a base station apparatus), SC-FDMA (Single-Carrier Frequency-Division Multiple Access) method is used, which is single-carrier transmission.

FIG. 18 illustrates a downlink radio frame structure in LTE. In the downlink, a Physical Downlink Control Channel (PDCCH), a Physical Downlink Shared Channel (PDSCH), or the like are mapped. In addition, a downlink reference signal is mapped to a part of the PDSCH. In addition, a downlink radio frame includes a downlink Resource Block (RB) pair.

The downlink RB pair, which is a unit of RB used when assigning a downlink radio resource, includes a frequency band (RB bandwidth) with a predetermined width and a time zone (2 slots=1 subframe). A downlink RB pair includes two downlink RBs (RB bandwidth×slot) which are contiguous in the time domain.

For example, a downlink RB includes 12 subcarriers in the frequency domain and includes seven OFDM symbols in the time domain. Here, a PDCCH is a physical channel which carries a mobile station identifier, scheduling information of a PDSCH, scheduling information of a Physical Uplink Shared Channel (PUSCH), Modulation and Coding Scheme (MCS) information (modulation scheme and coding rate), retransmission parameter information or the like, and which carries Downlink Control Information (DCI).

Here, a mobile station identifier, which is, for example, a C-RNTI (Cell-Radio Network Temporary Identifier), is an identifier effective only within a cell managed by a base station apparatus. The C-RNTI is assigned to a mobile station apparatus by the base station apparatus. In addition, scheduling information of a PDSCH may include RB assignment information for the PDSCH. In addition, scheduling information of a PUSCH may include RB assignment information for the PUSCH.

FIG. 19 illustrates an uplink radio frame structure in LTE. In the uplink, a Physical Uplink Control Channel (PUCCH), a Physical Uplink Shared Channel (PUSCH), or the like are mapped. In addition, an uplink reference signal is mapped to a part of the PUSCH and PUCCH. In addition, an uplink radio frame includes an uplink RB pair.

The uplink RB pair, which is a unit of RB used when assigning an uplink radio resource, includes a frequency band (RB bandwidth) with a predetermined width and a time zone (2 slots=1 subframe). For example, an uplink RB pair includes two uplink RBs (RB bandwidth×slot) which are contiguous in the time domain. In addition, for example, an uplink RB includes 12 subcarriers in the frequency domain and includes 7 SC-FDMA symbols in the time domain.

FIG. 20 is a schematic view illustrating reporting (feedback) of Channel Statement information (CSI) in LTE. Here, the channel state information includes a Channel Quality indicator (CQI).

A base station apparatus 2001 notifies a mobile station apparatus 2002 of DCI 2003 including uplink scheduling information (RB assignment information) indicating on which RB the mobile station apparatus 2002 transmits an uplink transmission signal 2004 including the channel state information. Based on the DCI notified from the base station apparatus 2001, the mobile station apparatus 2002 transmits the uplink transmission signal 2004 including the channel state information to the base station apparatus 2001.

FIG. 21 illustrates an exemplary configuration of a Downlink Control Information Format (DCI format) in LTE. As described in Non-patent document 1, a plurality of bit fields (information fields) is defined in a DCI Format0 including uplink-related information such as uplink scheduling information.

As illustrated in FIG. 21, for example, the leading bit field of the DCI Format0 includes a flag (Flag for Format0/Format1A) for distinguishing between the Format0 and Format1A which is another downlink control information format. The mobile station apparatus recognizes (identifies) the configuration of subsequent bit fields by first checking the flag for distinguishing between the Format0 and Format1A.

In addition, the DCI Format0 includes (is formed by) a bit field indicating uplink scheduling such as Hopping flag, RB assignment (Resource Block assignment) information or the like, a bit field for MCS (Modulation and Coding Scheme) and RV (Redundancy Version) indicating the modulation scheme, coding rate, retransmission parameters or the like, a bit field for New Data Indicator indicating whether the transmission is an initial transmission or a re-transmission, a bit field for CQI request indicating whether or not reporting of the channel state information (the channel quality indicator) is requested (bit field indicating whether or not a transmission of the channel state information (the channel quality indicator) is instructed), or the like.

For example, when the CQI request field of the DCI Format0 transmitted from the base station apparatus indicates a state in which reporting of the channel state information is performed (e.g., when the CQI request field is set to "1"), the mobile station apparatus transmits an uplink transmission signal including the channel state information to the base station apparatus.

PRIOR ART DOCUMENT

Non-Patent Document

Non-patent document 1: "3GPP TS36.212 v8.7.0 (2009-05)", May, 2009.

DISCLOSURE OF THE INVENTION

Problems to be Solved by the Invention

However, there has been a problem that, since the prior art assumes a system in which the number of bands as measurement (generation) targets of the channel state information between the base station apparatus and the mobile station apparatus is one, in a system where two or more bands the channel state information of which is to be measured can be configured, it has been impossible to specify measurement target of channel state or transmission resource, which may result in a decreased spectrum efficiency.

The present invention has been made in view of the above-mentioned problem, and has an object to provide, in a system where two or more bands channel state information of which is to be measured can be configured, a mobile communication system, a base station apparatus, a mobile station apparatus, and a communication method which can flexibly configure measurement target of channel state or transmission resource.

Means for Solving the Problems (1) In order to achieve the above-mentioned object, an embodiment of the present invention has taken the following measures. That is, a mobile communication system of the present invention is the one in which a base station apparatus and a mobile station apparatus communicate with each other using a plurality of component carriers configured by the base station apparatus, wherein the base station apparatus notifies the mobile station apparatus of a downlink control information format used for scheduling of a physical uplink shared channel in a certain specific uplink component carrier and, the mobile station apparatus, when downlink control information included in the downlink control information format is set to request transmission of channel state information, transmits, to the base station apparatus, channel state information of a downlink component carrier corresponding to the certain specific uplink component carrier.

(2) In addition, the mobile communication system of an embodiment of the present invention is characterized in that the mobile station apparatus transmits the channel state information to the base station apparatus, using the physical uplink shared channel in the certain specific uplink component carrier.

(3) In addition, a mobile communication system of an embodiment of the present invention is the one in which a base station apparatus and a mobile station apparatus communicate with each other using a plurality of component carriers configured by the base station apparatus, wherein the base station apparatus notifies the mobile station apparatus of a downlink control information format used for scheduling of a physical uplink shared channel and, the mobile station apparatus, when downlink control information included in the downlink control information format is set to request transmission of channel state information, transmits, to the base station apparatus using the physical uplink shared channel, channel state information of a downlink component carrier in which the downlink control information format has been detected.

(4) In addition, a mobile communication system of an embodiment of the present invention is the one in which a base station apparatus and a mobile station apparatus communicate with each other using a plurality of component carriers configured by the base station apparatus, wherein the base station apparatus notifies the mobile station apparatus of a physical downlink control channel to which downlink control information is mapped and, the mobile station apparatus, when the downlink control information is set to request transmission of channel state information, transmits, to the base station apparatus, channel state information of a downlink component carrier determined according to a search space in which the physical downlink control channel has been detected.

(5) In addition, the mobile communication system of an embodiment of the present invention is characterized in that the mobile station apparatus transmits the channel state information to the base station apparatus, using a physical uplink shared channel which has been scheduled according to a downlink control information format including the downlink control information.

(6) In addition, a mobile communication system of an embodiment of the present invention is the one in which a base station apparatus and a mobile station apparatus communicate with each other using a plurality of component carriers configured by the base station apparatus, wherein the base station apparatus notifies the mobile station apparatus of a downlink control information format used for scheduling of a physical uplink shared channel in a certain specific uplink component carrier and, the mobile station apparatus, according to a request for transmission of channel state information indicated by information included in the downlink control information format and a downlink component carrier associated with channel state information, transmits, to the base station apparatus, channel state information of the downlink component carrier, using the physical uplink shared channel in the certain specific uplink component carrier.

(7) In addition, the mobile communication system of an embodiment of the present invention is characterized in that the channel state information includes a channel quality indicator.

(8) In addition, a base station apparatus of an embodiment of the present invention is the one in a mobile communication system in which a base station apparatus and a mobile station apparatus communicate with each other using a plurality of component carriers configured by the base station apparatus, the base station apparatus including: a notifier which notifies the mobile station apparatus of a downlink control information format used for scheduling of a physical uplink shared channel in a certain specific uplink component carrier; and a receiver which receives, from the mobile station apparatus, channel state information of a downlink component carrier corresponding to the certain specific uplink component carrier, when downlink control information included in the downlink control information format has been set to request transmission of channel state information.

(9) In addition, the base station apparatus of an embodiment of the present invention is characterized in that the receiver which receives the channel state information from the mobile station apparatus uses the physical uplink shared channel in the certain specific uplink component carrier to receive the channel state information from the mobile station apparatus.

(10) In addition, a base station apparatus of an embodiment of the present invention is the one in a mobile communication system in which a base station apparatus and a mobile station apparatus communicate with each other using a plurality of component carriers configured by the base station apparatus, the base station apparatus including: a notifier which notifies the mobile station apparatus of a downlink control information format used for scheduling of a physical uplink shared channel; and a receiver which receives, from the mobile station apparatus, channel state information of a downlink component carrier in which the mobile station apparatus has detected the downlink control information format, using the physical uplink shared channel, when downlink control information included in the downlink control information format is set to request transmission of channel state information.

(11) In addition, a base station apparatus of the an embodiment of present invention is the one in a mobile communication system in which a base station apparatus and a mobile station apparatus communicate with each other using a plurality of component carriers configured by the base station apparatus, the base station apparatus including: a notifier which notifies the mobile station apparatus of a physical downlink control channel to which downlink control information is mapped; and a receiver which receives, from the mobile station apparatus, channel state information of a downlink component carrier determined according to a search space in which the mobile station apparatus has detected the physical downlink control channel, when the downlink control information is set to request transmission of channel state information.

(12) In addition, the base station apparatus of an embodiment of the present invention is characterized in that the receiver which receives the channel state information from the mobile station apparatus uses a physical uplink shared channel which has been scheduled according to a downlink control information format including the downlink control information to receive the channel state information from the mobile station apparatus.

(13) In addition, a base station apparatus of an embodiment of the present invention is the one in a mobile communication system in which a base station apparatus and a mobile station apparatus communicate with each other using a plurality of component carriers configured by the base station apparatus, the base station apparatus including: a notifier which notifies the mobile station apparatus of a downlink control information format used for scheduling of a physical uplink shared channel in a certain specific uplink component carrier; and a receiver which receives, from the mobile station apparatus, channel state information of the downlink component carrier, using the physical uplink shared channel in the certain specific uplink component carrier, according to a request for transmission of channel state information indicated by information included in the downlink control information format and a downlink component carrier associated with channel state information.

(14) In addition, the base station apparatus of an embodiment of the present invention is characterized in that the channel state information includes a channel quality indicator.

(15) In addition, a mobile station apparatus of an embodiment of the present invention is the one in a mobile communication system in which a base station apparatus and a mobile station apparatus communicate with each other using a plurality of component carriers configured by the base station apparatus, the mobile station apparatus including: a detector which detects a downlink control information format used for scheduling of a physical uplink shared channel in a certain specific uplink component carrier; and a transmitter which transmits, to the base station apparatus, channel state information of a downlink component carrier corresponding to the certain specific uplink component carrier, when downlink control information included in the downlink control information format is set to request transmission of channel state information.

(16) In addition, the mobile station apparatus of an embodiment of the present invention is characterized in that the transmitter which transmits the channel state information to the base station apparatus uses the physical uplink shared channel in the certain specific uplink component carrier to transmit the channel state information to the base station apparatus.

(17) In addition, a mobile station apparatus of an embodiment of the present invention is the one in a mobile communication system in which a base station apparatus and a mobile station apparatus communicate with each other using a plurality of component carriers configured by the base station apparatus, the mobile station apparatus including: a detector which detects a downlink control information format used for scheduling of a physical uplink shared channel; and a transmitter which transmits, to the base station apparatus, using the physical uplink shared channel, channel state information of a downlink component carrier in which the downlink control information format has been detected, when downlink control information included in the downlink control information format is set to request transmission of channel state information.

(18) In addition, a mobile station apparatus of an embodiment of the present invention is the one in a mobile communication system in which a base station apparatus and a mobile station apparatus communicate with each other using a plurality of component carriers configured by the base station apparatus, the mobile station apparatus including: a detector which detects a physical downlink control channel to which downlink control information is mapped; and a transmitter which transmits, to the base station apparatus, channel state information of a downlink component carrier determined according to a search space in which the physical downlink control channel has been detected, when the downlink control information is set to request transmission of channel state information.

(19) In addition, the mobile station apparatus of an embodiment of the present invention is characterized in that the transmitter which transmits the channel state information to the base station apparatus uses a physical uplink shared channel which has been scheduled according to a downlink control information format including the downlink control information to transmit the channel state information to the base station apparatus.

(20) In addition, a mobile station apparatus of an embodiment of the present invention is the one in a mobile communication system in which a base station apparatus and a mobile station apparatus communicate with each other using a plurality of component carriers configured by the base station apparatus, the mobile station apparatus including: a detector which detects a downlink control information format used for scheduling of a physical uplink shared channel in a certain specific uplink component carrier; and a transmitter which transmits, to the base station apparatus, channel state information of the downlink component carrier, using the physical uplink shared channel in the certain specific uplink component carrier, according to a request for transmission of channel state information indicated by information included in the downlink control information format and a downlink component carrier associated with channel state information.

(21) In addition, the mobile station apparatus of an embodiment of the present invention is characterized in that the channel state information includes a channel quality indicator.

(22) In addition, a communication method of an embodiment of the present invention is the one of a base station apparatus in a mobile communication system in which a base station apparatus and a mobile station apparatus communicate with each other using a plurality of component carriers configured by the base station apparatus, the communication method including the steps of: notifying the mobile station apparatus of a downlink control information format used for scheduling of a physical uplink shared channel in a certain specific uplink component carrier; and receiving, from the mobile station apparatus, channel state information of a downlink component carrier corresponding to the certain specific uplink component carrier, when downlink control information included in the downlink control information format is set to request transmission of channel state information.

(23) In addition, the communication method of an embodiment of the present invention is characterized by including a step of receiving the channel state information from the mobile station apparatus, using the physical uplink shared channel in the certain specific uplink component carrier.

(24) In addition, a communication method of an embodiment of the present invention is the one of a base station apparatus in a mobile communication system in which a base station apparatus and a mobile station apparatus communicate with each other using a plurality of component carriers configured by the base station apparatus, the communication method including the steps of: notifying the mobile station apparatus of a downlink control information format used for scheduling of a physical uplink shared channel; and receiving, from the mobile station apparatus, using the physical uplink shared channel, channel state information of a downlink component carrier in which the mobile station apparatus has detected the downlink control information format, when downlink control information included in the downlink control information format is set to request transmission of channel state information.

(25) In addition, a communication method of an embodiment of the present invention is the one of a base station apparatus in a mobile communication system in which a base station apparatus and a mobile station apparatus communicate with each other using a plurality of component carriers configured by the base station apparatus, the communication method including the steps of: notifying the mobile station apparatus of a physical downlink control channel to which downlink control information is mapped; and receiving, from the mobile station apparatus, channel state information of a downlink component carrier determined according to a search space in which the mobile station apparatus has detected the physical downlink control channel, when the downlink control information is set to request transmission of channel state information.

(26) In addition, the communication method of an embodiment of the present invention is characterized by including a step of receiving the channel state information from the mobile station apparatus, using a physical uplink shared channel which has been scheduled according to a downlink control information format including the downlink control information.

(27) In addition, a communication method of an embodiment of the present invention is the one of a base station apparatus in a mobile communication system in which a base station apparatus and a mobile station apparatus communicate with each other using a plurality of component carriers configured by the base station apparatus, the communication method including the steps of: notifying the mobile station apparatus of a downlink control information format used for scheduling of a physical uplink shared channel in a certain specific uplink component carrier; and receiving, from the mobile station apparatus, channel state information of the downlink component carrier, using the physical uplink shared channel in the certain specific uplink component carrier, according to a request for transmission of channel state information indicated by information included in the downlink control information format and a downlink component carrier associated with channel state information.

(28) In addition, the communication method of an embodiment of the present invention is characterized in that the channel state information includes a channel quality indicator.

(29) In addition, a communication method of an embodiment of the present invention is the one of a mobile station apparatus in a mobile communication system in which a base station apparatus and a mobile station apparatus communicate with each other using a plurality of component carriers configured by the base station apparatus, the communication method including the steps of: detecting a downlink control information format used for scheduling of a physical uplink shared channel in a certain specific uplink component carrier; and transmitting, to the base station apparatus, channel state information of a downlink component carrier corresponding to the certain specific uplink component carrier, when downlink control information included in the downlink control information format is set to request transmission of channel state information.

(30) In addition, the communication method of an embodiment of the present invention is characterized by including a step of transmitting the channel state information to the base station apparatus, using the physical uplink shared channel in the certain specific uplink component carrier.

(31) In addition, a communication method of an embodiment of the present invention is the one of a mobile station apparatus in a mobile communication system in which a base station apparatus and a mobile station apparatus communicate with each other using a plurality of component carriers configured by the base station apparatus, the communication method including the steps of: detecting a downlink control information format used for scheduling of a physical uplink shared channel; and transmitting, to the base station apparatus, using the physical uplink shared channel, channel state information of a downlink component carrier in which the downlink control information format has been detected, when downlink control information included in the downlink control information format is set to request transmission of channel state information.

(32) In addition, a communication method of an embodiment of the present invention is the one of a mobile station apparatus in a mobile communication system in which a base station apparatus and a mobile station apparatus communicate with each other using a plurality of component carriers configured by the base station apparatus, the communication method including the steps of: detecting a physical downlink control channel to which downlink control information is mapped; and transmitting, to the base station apparatus, channel state information of a downlink component carrier determined according to a search space in which the physical downlink control channel has been detected, when the downlink control information is set to request transmission of channel state information.

(33) In addition, the communication method of an embodiment of the present invention is characterized by including a step transmitting the channel state information to the base station apparatus, using a physical uplink shared channel which has been scheduled according to a downlink control information format including the downlink control information.

(34) In addition, a communication method of an embodiment of the present invention is the one of a mobile station apparatus in a mobile communication system in which a base station apparatus and a mobile station apparatus communicate with each other using a plurality of component carriers configured by the base station apparatus, the communication method including the steps of: detecting a downlink control information format used for scheduling of a physical uplink shared channel in a certain specific uplink component carrier; and transmitting, to the base station apparatus, channel state information of the downlink component carrier, using the physical uplink shared channel in the certain specific uplink component carrier, according to a request for transmission of channel state information indicated by information included in the downlink control information format and a downlink component carrier associated with channel state information.

(35) Additionally, the communication method of an embodiment of the present invention is characterized in that the channel state information includes a channel quality indicator.

(36) In addition, a base station apparatus of an embodiment of the present invention is the one in a mobile communication system in which a base station apparatus and a mobile station apparatus communicate with each other using a plurality of component carriers configured by the base station apparatus, the base station apparatus including: abase station side transmitting unit which notifies the mobile station apparatus of a downlink control information format used for scheduling of a physical uplink shared channel in a certain specific uplink component carrier; and a base station side receiving unit which receives, from the mobile station apparatus, channel state information of a downlink component carrier corresponding to the certain specific uplink component carrier, when downlink control information included in the downlink control information format is set to request transmission of channel state information.

(37) In addition, the base station apparatus of an embodiment of the present invention is characterized in that the base station side receiving unit which receives the channel state information from the mobile station apparatus uses the physical uplink shared channel in the certain specific uplink component carrier to receive the channel state information from the mobile station apparatus.

(38) In addition, a base station apparatus of an embodiment of the present invention is the one in a mobile communication system in which a base station apparatus and a mobile station apparatus communicate with each other using a plurality of component carriers configured by the base station apparatus, the base station apparatus including: abase station side transmitting unit which notifies the mobile station apparatus of a downlink control information format used for scheduling of a physical uplink shared channel; and a base station side receiving unit which receives, from the mobile station apparatus, using the physical uplink shared channel, channel state information of a downlink component carrier in which the mobile station apparatus has detected the downlink control information format, when downlink control information included in the downlink control information format is set to request transmission of channel state information.

(39) In addition, a base station apparatus of an embodiment of the present invention is the one in a mobile communication system in which a base station apparatus and a mobile station apparatus communicate with each other using a plurality of component carriers configured by the base station apparatus, the base station apparatus including: abase station side transmitting unit which notifies the mobile station apparatus of a physical downlink control channel to which downlink control information is mapped; and a base station side receiving unit which receives, from the mobile station apparatus, channel state information of a downlink component carrier determined according to a search space in which the mobile station apparatus has detected the physical downlink control channel, when the downlink control information is set to request transmission of channel state information.

(40) In addition, the base station apparatus of an embodiment of the present invention is characterized in that the base station side receiving unit which receives the channel state information from the mobile station apparatus uses a physical uplink shared channel which has been scheduled according to a downlink control information format including the downlink control information to receive the channel state information from the mobile station apparatus.

(41) In addition, a base station apparatus of an embodiment of the present invention is the one in a mobile communication system in which a base station apparatus and a mobile station apparatus communicate with each other using a plurality of component carriers configured by the base station apparatus, the base station apparatus including: abase station side transmitting unit which notifies the mobile station apparatus of a downlink control information format used for scheduling of a physical uplink shared channel in a certain specific uplink component carrier; and a base station side receiving unit which receives, from the mobile station apparatus, channel state information of the downlink component carrier, using the physical uplink shared channel in the certain specific uplink component carrier, according to a request for transmission of channel state information indicated by information included in the downlink control information format and a downlink component carrier associated with channel state information.

(42) In addition, the base station apparatus of an embodiment of the present invention is characterized in that the channel state information includes a channel quality indicator.

(43) In addition, a mobile station apparatus of an embodiment of the present invention is the one in a mobile communication system in which a base station apparatus and a mobile station apparatus communicate with each other using a plurality of component carriers configured by the base station apparatus, the mobile station apparatus including: a mobile station side receiving unit which detects a downlink control information format used for scheduling of a physical uplink shared channel in a certain specific uplink component carrier; and a mobile station side transmitting unit which transmits, to the base station apparatus, channel state information of a downlink component carrier corresponding to the certain specific uplink component carrier, when downlink control information included in the downlink control information format is set to request transmission of channel state information.

(44) In addition, the mobile station apparatus of an embodiment of the present invention is characterized in that the mobile station side transmitting unit which transmits the channel state information to the base station apparatus uses the physical uplink shared channel in the certain specific uplink component carrier to transmit the channel state information to the base station apparatus.

(45) In addition, a mobile station apparatus of an embodiment of the present invention is the one in a mobile communication system in which a base station apparatus and a mobile station apparatus communicate with each other using a plurality of component carriers configured by the base station apparatus, the mobile station apparatus including: a mobile station side receiving unit which detects a downlink control information format used for scheduling of a physical uplink shared channel; and a mobile station side transmitting unit which transmits, to the base station apparatus, using the physical uplink shared channel, channel state information of a downlink component carrier in which the downlink control information format has been detected, when downlink control information included in the downlink control information format is set to request transmission of channel state information.

(46) In addition, a mobile station apparatus of an embodiment of the present invention is the one in a mobile communication system in which a base station apparatus and a mobile station apparatus communicate with each other using a plurality of component carriers configured by the base station apparatus, the mobile station apparatus including: a mobile station side receiving unit which detects a physical downlink control channel to which downlink control information is mapped; and a mobile station side transmitting unit which transmits, to the base station apparatus, channel state information of a downlink component carrier determined according to a search space in which the physical downlink control channel has been detected, when the downlink control information is set to request transmission of channel state information.

(47) In addition, the mobile station apparatus of an embodiment of the present invention is characterized in that the mobile station side transmitting unit which transmits the channel state information to the base station apparatus uses a physical uplink shared channel which has been scheduled according to a downlink control information format including the downlink control information to transmit the channel state information to the base station apparatus.

(48) In addition, a mobile station apparatus of an embodiment of the present invention is the one in a mobile communication system in which a base station apparatus and a mobile station apparatus communicate with each other using a plurality of component carriers configured by the base station apparatus, the mobile station apparatus including: a mobile station side receiving unit which detects a downlink control information format used for scheduling of a physical uplink shared channel in a certain specific uplink component carrier; and a mobile station side transmitting unit which transmits, to the base station apparatus, channel state information of the downlink component carrier, using the physical uplink shared channel in the certain specific uplink component carrier, according to a request for transmission of channel state information indicated by information included in the downlink control information format and a downlink component carrier associated with channel state information.

(49) In addition, the mobile station apparatus of an embodiment of the present invention is characterized in that the channel state information includes a channel quality indicator.

According to the present invention, measurement target of channel state or a transmission resource can be flexibly specified.

BRIEF DESCRIPTION OF THE DRAWINGS

FIG. 6 illustrates an exemplary specification of a downlink component carrier according to an embodiment of the present invention;

FIG. 8 illustrates an exemplary structure of a physical downlink control channel according to an embodiment of the present invention;

FIG. 9 illustrates another exemplary specification of a downlink component carrier according to an embodiment of the present invention;

FIG. 11 illustrates an exemplary pair of a downlink component carrier and an uplink component carrier according to an embodiment of the present invention;

FIG. 15 illustrates a relation between a search space and a downlink control information format according to an embodiment of the present invention;

BEST MODES FOR CARRYING OUT THE INVENTION

First Embodiment

Figure 1:
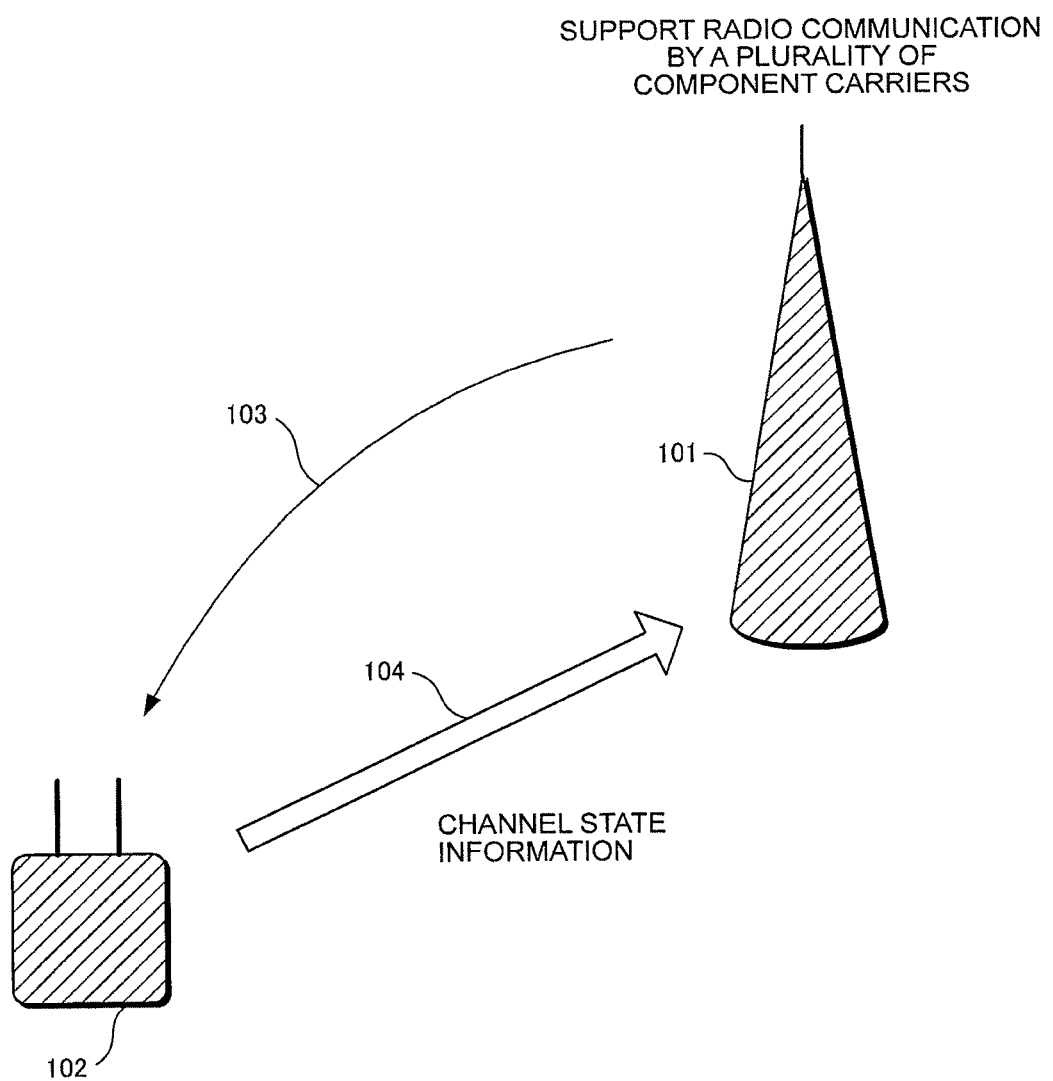
FIG. 1 illustrates simple overview of a radio communication system according to an embodiment of the present invention.

In the following, a first embodiment of the present invention will be described, referring to the drawings.

FIG. 1 is a schematic view of a radio communication system according to the first embodiment. A base station apparatus (also referred to as eNodeB, eNB, downlink transmitting device, uplink receiving device, or cell) 101 performs radio communication with a mobile station apparatus (also referred to as UE: User Equipment, downlink receiving device, uplink transmitting device, or terminal) 102, using as least a plurality of downlink component carriers and/or uplink component carriers (one or more downlink component carriers and/or one or more uplink component carriers). Here, the downlink component carriers and/or the uplink component carriers on which the base station apparatus 101 and the mobile station apparatus 102 perform communication with each other are configured by the base station apparatus 101 for the mobile station apparatus 102.

Here, a Component Carrier (CC) indicates a (narrow) frequency band used compositely when the base station apparatus 101 and the mobile station apparatus 102 perform communication with each other in a wider frequency band. Hereinafter, in the present embodiment, a downlink component carrier is also referred to as a DLCC, and an uplink component carrier is also referred to as a ULCC. The base station apparatus 101 and the mobile station apparatus 102 perform radio communication with each other by forming a wider frequency band by aggregating one or more component carriers and using the component carriers compositely (referred to as Carrier Aggregation). For example, the base station apparatus 101 and the mobile station apparatus 102 can realize higher speed radio communication by aggregating five component carriers each having a bandwidth of 20 MHz to form a wider frequency band having a bandwidth of 100 MHz and using these five frequency bands compositely.

In the present embodiment described below, a frequency band is defined by a bandwidth (Hz) or the number of resource blocks (RB) including frequency and time. In other words, a bandwidth may be defined by the number of resource blocks. In addition, a bandwidth and the number of resource blocks can be defined also by the number of subcarriers.

A component carrier in the present embodiment indicates each (narrow) frequency band (e.g., a frequency band having a bandwidth of 20 MHz) constituting a (wider) frequency band (e.g., a frequency band having a bandwidth of 100 MHz). In addition, a component carrier may indicate a (center) carrier frequency of each of the (narrow) frequency bands. In addition, a component carrier may be defined as a unit for forming a specific physical channel (e.g., PDCCH, PUCCH, etc.).

Furthermore, a component carrier may be mapped in contiguous frequency bands or may be mapped in non-contiguous frequency bands. The base station apparatus 101 and the mobile station apparatus 102 can perform radio communication by aggregating component carriers which are contiguous and/or non-contiguous frequency bands to form a wider frequency band, and using these component carriers compositely.

Furthermore, the frequency band used for downlink communication and the frequency band used for uplink communication formed by component carriers need not have a same bandwidth, and thus the base station apparatus 101 and the mobile station apparatus 102 can perform communication using compositely a downlink frequency band and an uplink frequency band having different bandwidths and formed by the component carrier (referred to as Asymmetric Carrier Aggregation). On the other hand, performing communication between the base station apparatus 101 and the mobile station apparatus 102 using compositely a downlink frequency band and an uplink frequency band having a same bandwidth formed by the component carrier is also referred to as Symmetric Carrier Aggregation.

In FIG. 1, when receiving an uplink transmission signal 104 from the mobile station apparatus 102, the base station apparatus 101 notifies the mobile station apparatus 102 of Downlink Control Information (DCI) 103 including uplink scheduling information indicating on which RB the mobile station apparatus 102 transmits an uplink transmission signal (SC-FDMA signal or Clustered DFT (Discrete Fourier Transformation)-precoded-OFDM signal), or information indicating whether or not reporting of the channel state information is requested.

When the information transmitted from the base station apparatus 101 and indicating whether or not reporting of the channel state information is requested indicates that reporting of the channel state information is requested (e.g., when the CQI request field is set to "1"), the mobile station apparatus 102 includes the channel state information in the uplink transmission signal 104 to be transmitted via a transmission resource specified by the uplink scheduling information.

In the following, for simplicity, a case where information indicating whether or not reporting of the channel state information included in the DCI from the base station apparatus 101 is requested indicates that reporting of the channel state information is requested is also described as the CQI request field being set to "1". Here, although the case where reporting of the channel state information is requested is described as a case where the CQI request field indicates "1", it is needless to say that the present embodiment can be applied regardless of how the base station apparatus 101 indicates request for reporting of the channel state information.

In addition, if there is no uplink data to be multiplexed in the uplink transmission signal 104, or if transmission of only the control information such as the channel state information is indicated by the downlink control information 103, the mobile station apparatus 102 transmits the uplink transmission signal 104 including only the control information such as the channel state information. Here, uplink data includes a transport block for an Uplink-Shared Channel (UL-SCH). The uplink shared channel is a transport channel and, if transmission of only the control information is instructed by the base station apparatus 101, the mobile station apparatus 102 transmits the uplink transmission signal 104 including only the control information such as the channel state information without any transport block for the UL-SCH accompanied therewith.

For example, upon receiving a request for reporting of the channel state information from the base station apparatus 101, the mobile station apparatus 102 transmits the uplink transmission signal 104 having the channel state information and uplink data (UL-SCH) multiplexed (included) therein to the base station apparatus 101. In addition, for example, when instructed to transmit only the control information by the base station apparatus 101, the mobile station apparatus 102 transmits the uplink transmission signal 104 having only the channel state information included therein without accompanying the uplink data (UL-SCH) to the base station apparatus 101.

Figure 2:
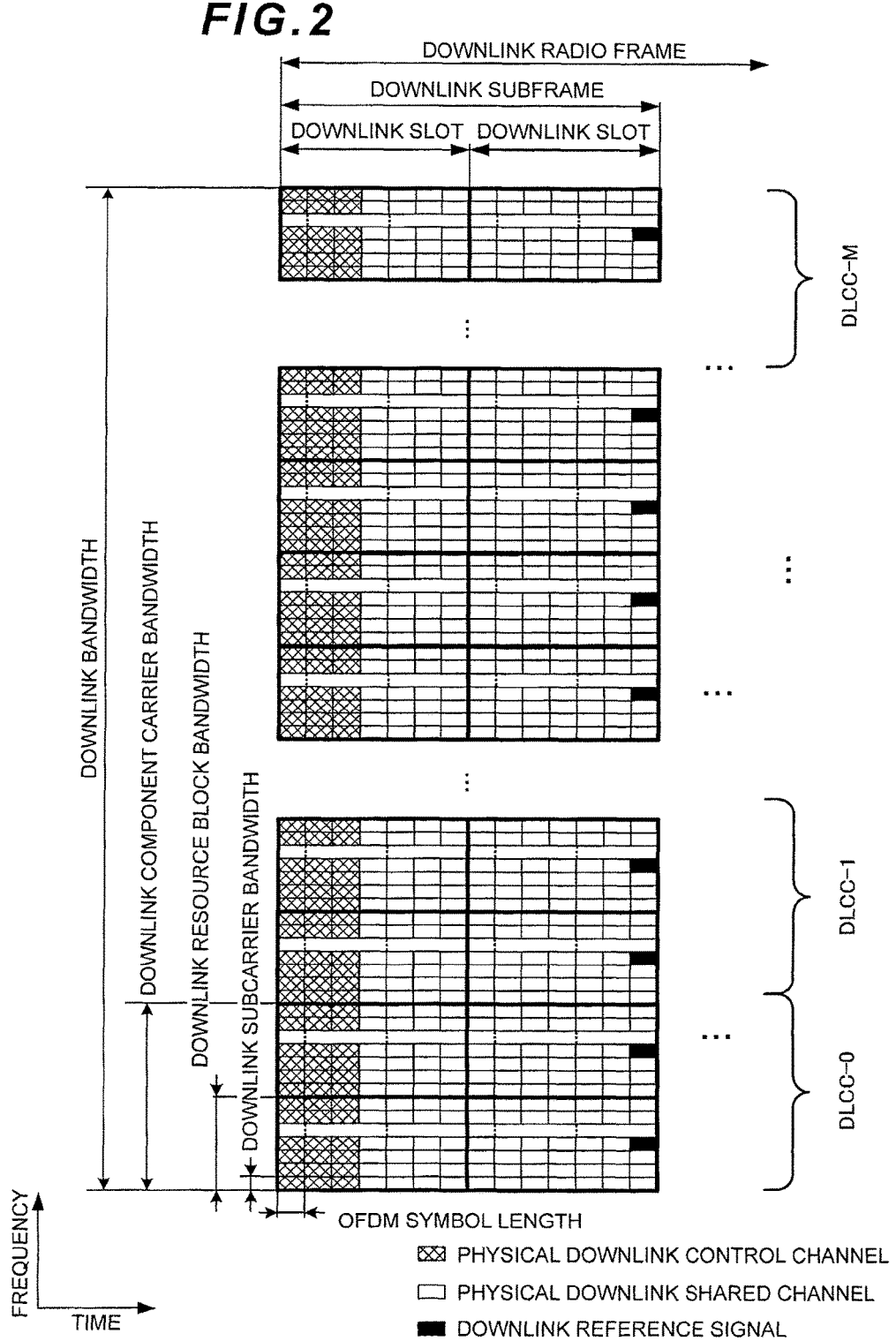
FIG. 2 illustrates an exemplary structure of a downlink radio frame according to an embodiment of the present invention.

FIG. 2 illustrates an exemplary structure of a downlink radio frame according to the present embodiment. A downlink has mapped therein a Physical Downlink Control Channel (PDCCH), a Physical Downlink Shared Channel (PDSCH), or the like. In addition, a downlink reference signal is mapped to a part of the PDSCH.

In addition, a downlink radio frame includes a downlink Resource Block (RB) pair. The downlink RB pair, which is a unit of RB used when assigning a downlink radio resource, includes a frequency band (RB bandwidth) and a time zone (2 slots=1 subframe) of a predetermined width. A downlink RB pair includes two contiguous downlink RBs (RB bandwidth×slot) in the time domain. For example, a downlink RB includes 12 subcarriers in the frequency domain and 7 OFDM symbols in the time domain.

Here, a PDCCH is a region to which downlink control information (DCI) is mapped. In addition, a downlink subframe has subframes DLCC-0 to DLCC-M which are M Downlink Component Carriers (DLCC) each having a predetermined bandwidth.

Figure 3:
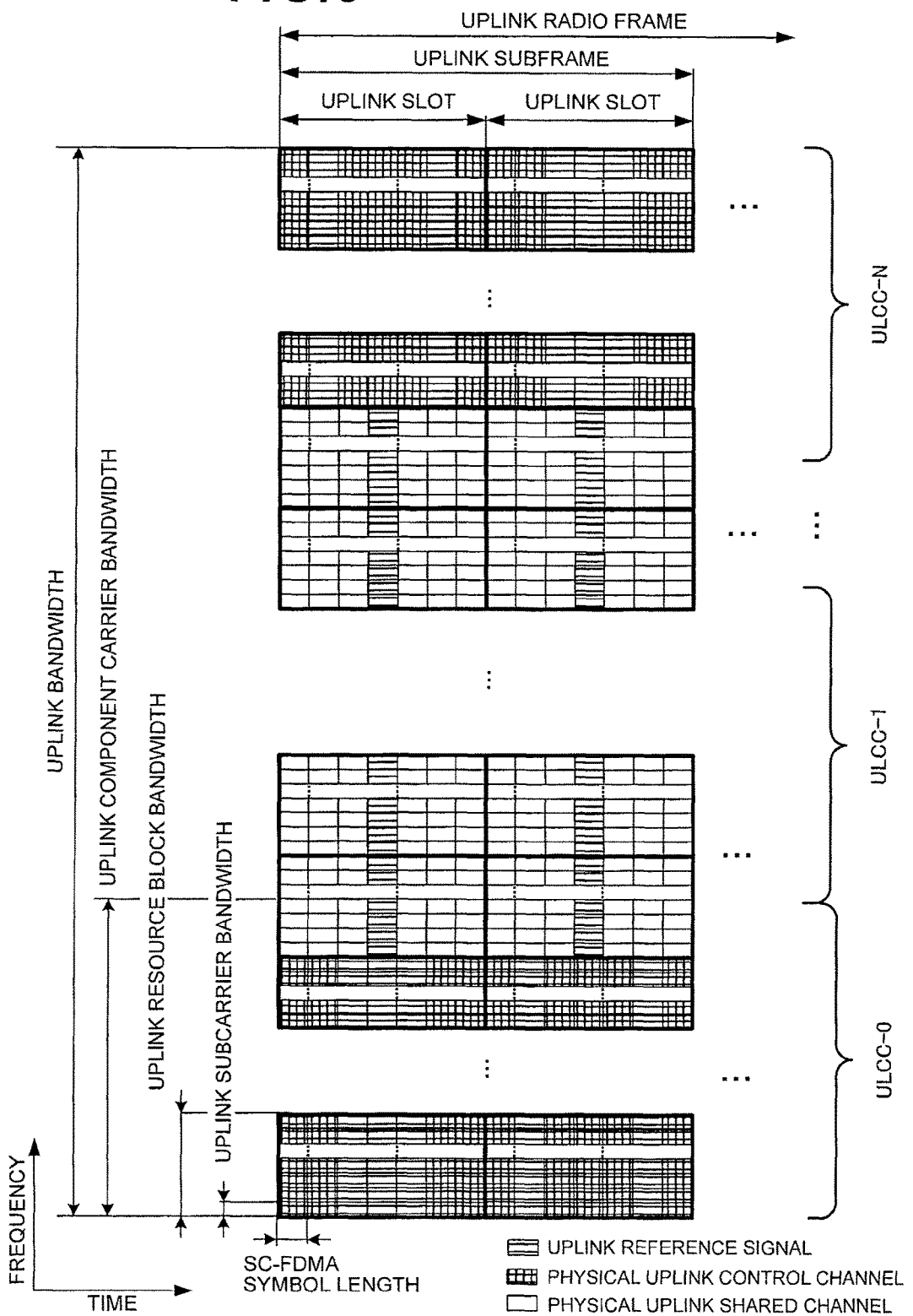
FIG. 3 illustrates an exemplary structure of an uplink radio frame according to an embodiment of the present invention.

FIG. 3 illustrates an exemplary structure of an uplink radio frame according to the present embodiment. In the uplink a Physical Uplink Shared Channel (PUSCH), a Physical Uplink Control Channel (PUCCH), and the like are assigned. In addition, an uplink reference signal is assigned to a part of the PUSCH or the PUCCH.

In addition, an uplink radio frame includes an uplink Resource Block (RB) pair. The uplink RB pair, which is a unit of RB used when assigning an uplink radio resource, includes a frequency band (RB bandwidth) and a time zone (2 slots=1 subframe) of a predetermined width. An uplink RB pair includes two contiguous uplink RBs (RB bandwidth×slot) in the time domain. For example, an uplink RB includes 12 subcarriers in the frequency domain and 7 SC-FDMA symbols or Clustered DFT-precoded-OFDM symbols in the time domain.

In addition, there are subframes ULCC-0 to ULCC-N, as uplink subframes, which are N Uplink Component Carriers (ULCC) each having a predetermined bandwidth. As described above, M, the number of DLCCs, and N, the number of ULCCs, may take a same value or may take different values.

Figure 4:
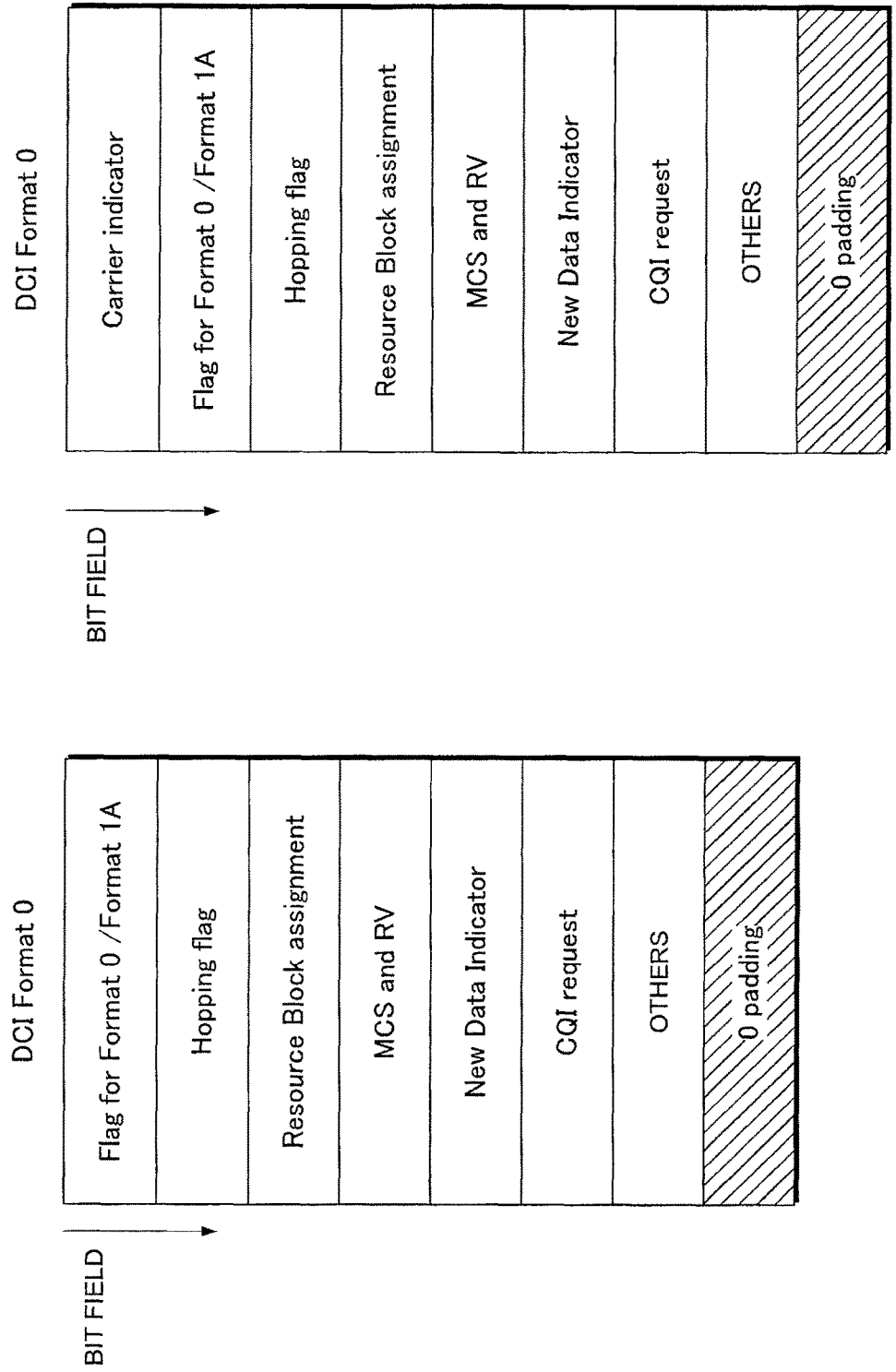
FIG. 4 illustrates an exemplary configuration of downlink control information format according to an embodiment of the present invention.

FIG. 4 illustrates an exemplary configuration of downlink control information format (DCI Format) according to the first embodiment. FIG. 4 illustrates two examples as a downlink control information format (DCI Format0) to be used in the uplink. As shown in FIG. 4, the two Format0s respectively include uplink-related information such as uplink scheduling information and respectively have a plurality of bit fields (information fields) (formed by bit fields).

The DCI Format0 illustrated on the left side of FIG. 4 is used when, for example, the base station apparatus 101 communicates with the mobile station apparatus 102 using a ULCC which is configured by the base station apparatus 101 to be Cell-specific or UE-specific. Is also used when, for example, the base station apparatus 101 communicates with the mobile station apparatus 102 using a fixed ULCC. It is also used when, for example, the base station apparatus 101 communicates with the mobile station apparatus 102 using a single ULCC. In other words, the DCI Format0 illustrated on the left side of FIG. 4 may be used when there is a common recognition between the base station apparatus 101 and the mobile station apparatus 102 as to in which ULCC the related information is included (for example, as to resource assignment information for the PUSCH allocated to which ULCC).

For example, the leading bit field of the DCI Format0 illustrated on the left side of FIG. 4 includes a flag (Flag for Format0/Format1A) for distinguishing between the DCI Format0 and Format1A which is another downlink control information format. The mobile station apparatus 102 first checks the flag for distinguishing between the DCI Format0 and Format1A, and recognizes (identifies) subsequent bit field configurations.

In addition, the DCI Format0 includes (is formed by) a bit field indicating uplink scheduling such as a Hopping flag, RB assignment information or the like; a bit field for an MCS (Modulation and Coding Scheme) and RV (Redundancy Version) indicating modulation scheme and coding rate, parameters for retransmission or the like; a bit field for New Data Indicator indicating whether the transmission is initial transmission or re-transmission; a bit field for CQI request indicating whether or not reporting of the channel state information (the channel quality indicator) is requested (bit field indicating an instruction to transmit the channel state information), or the like.

Here, the mobile station apparatus 102 recognizes, in common with the base station apparatus 101, which ULCC the uplink RB assigned based on the hopping flag and the RB assignment information is associated with. For example, when the CQI request field included in the DCI Format0 indicates a state to report the channel state information, the mobile station apparatus 102 generates channel state information and reports the generated channel state information via the PUSCH assigned by the DCI Format0.

As described above, the base station apparatus 101 can configure, for the mobile station apparatus 102, the ULCC to be Cell-specific or mobile-station-apparatus-specific (UE-specific). In other words, the base station apparatus 101 can preliminarily configure the ULCC for the mobile station apparatus 102. In addition, the base station apparatus 101 may configure, for the mobile station apparatus 102, the correspondence (linking) between the DLCC and the ULCC to be Cell-specific or UE-specific. In other words, the base station apparatus 101 can preliminarily configure the link between the DLCC and the ULCC for the mobile station apparatus 102. Here, the DCI Format0 illustrated on the left side of FIG. 4 can be regarded as a DCI Format0 not including a CIF (Carrier Indicator Field) described below.

For example, when a PUSCH is assigned by the DCI Format0 not including a CIF, the mobile station apparatus 102 reports the channel state information via a PUSCH allocated in a ULCC configured by the base station apparatus 101.

In addition, when a PUSCH is assigned by a DCI Format0 not including a CIF allocated in a certain DLCC (e.g., DLCC-1), for example, the mobile station apparatus 102 reports the channel state information via a PUSCH allocated in a ULCC (e.g., UL-CC2) linked to a certain DLCC by the base station apparatus 101. Here, it is assumed that the base station apparatus 101 has linked the DLCC-1 and the ULCC-2 to the mobile station apparatus 102 in a Cell-specific or UE-specific manner.

The DCI Format0 illustrated on the right side of FIG. 4 includes, in addition to the DCI Format0 illustrated on the left side of FIG. 4, a bit field for a CIF (Carrier Indicator Field). Here, the CIF is a field for a Carrier Indicator indicating which ULCC the uplink RB assigned by the hopping flag and the RB assignment information is associated with. For example, using the CIF, the base station apparatus 101 can indicate, to the mobile station apparatus 102, a ULCC to which a PUSCH assigned by the DCI Format0 is allocated.

The mobile station apparatus 102 transmits the PUSCH using the uplink RB assigned by the hopping flag and the RB assignment information in the ULCC indicated by the CIF. Here, if the CQI request field included in the DCI Format0 from the base station apparatus 101 is set to "1", the mobile station apparatus 102 generates the channel state information and reports the generated channel state information via the PUSCH assigned by the DCI Format0 including the CIF.

Here, 0-padding (region shown by diagonal lines) at the end of the two Format0s shown in FIG. 4 is inserted in order to equalize the payload size (number of bits) of the Format0 and Format1A (indicating a bit field with value 0, for example). For example, the 0-padding may be inserted when the number of bits of the Format0 is smaller than the number of bits of the Format1A.

Figure 5:
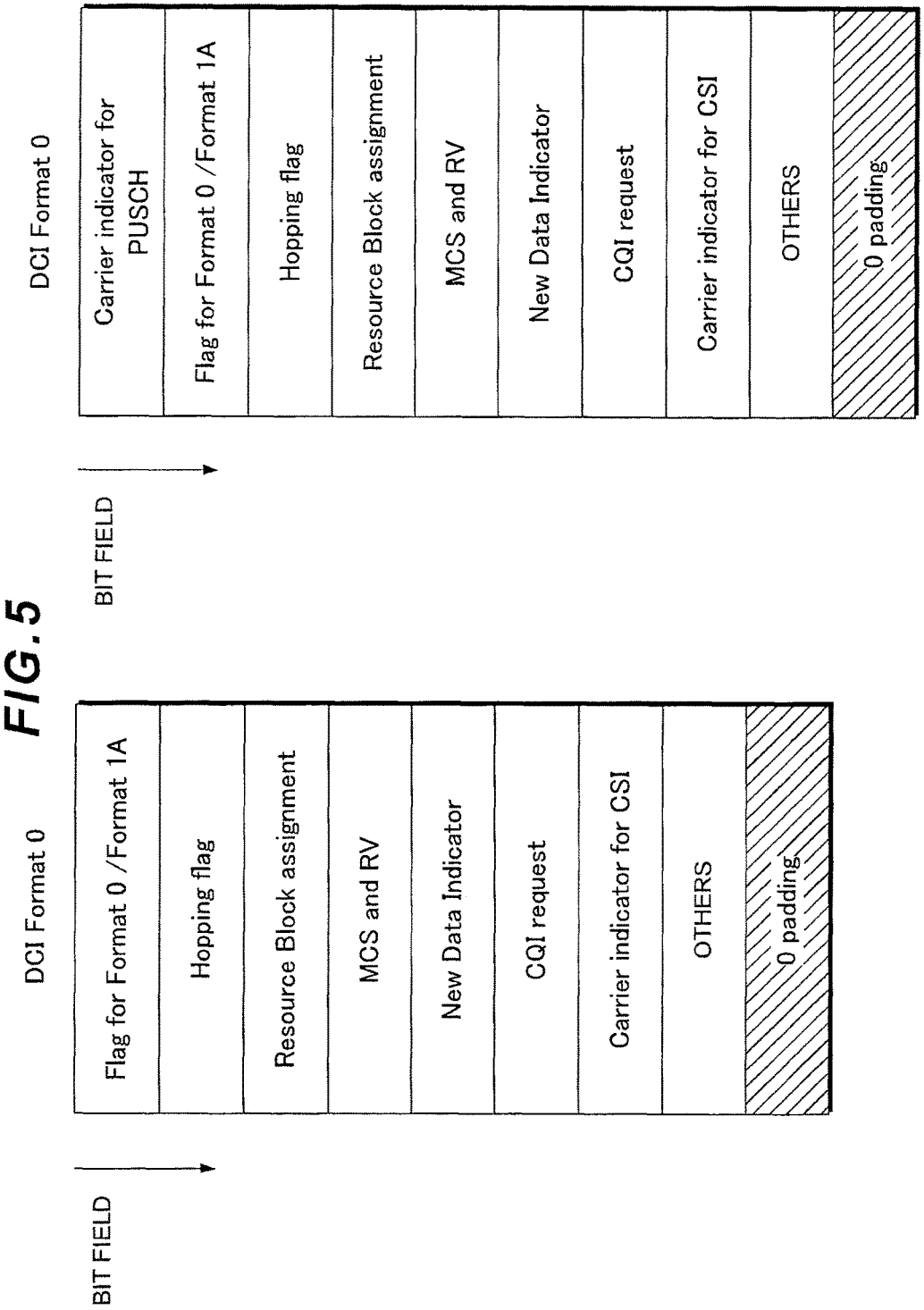
FIG. 5 illustrates another exemplary configuration of downlink control information format according to an embodiment of the present invention.

FIG. 5 illustrates another exemplary configuration of downlink control information format (DCI Format) according to the first embodiment. The two DCI Format0s shown in FIG. 5 include, in addition to the DCI Format0 shown in FIG. 4, a Carrier Indicator Field for the channel state information (Carrier Indicator for the CSI). Here, the CIF for the channel state information may be a CIF for the CQI (Carrier Indicator for the CQI). In FIG. 5, for clarity, the Carrier Indicator shown in FIG. 4 is described as a Carrier Indicator for the PUSCH.

Here, if the CQI request field included in the DCI Format0 from the base station apparatus 101 is set to "1", the CIF for the CSI is a field for Carrier Information indicating which DLCC the channel state information is associated with.

When acquisition of the channel state information in any DLCC is desired, the base station apparatus 101 specifies a state to report the channel state information in the CQI request field, and also indicates, in the CIF for the CSI, the DLCC for which acquisition of the channel state information is desired to the mobile station apparatus 102. The mobile station apparatus 102 generates the channel state information for the DLCC indicated by the CIF for the CSI which has been transmitted from the base station apparatus 101, and reports the generated channel state information via the PUSCH assigned by the DCI Format0.

In other words, the mobile station apparatus 102 generates (measures) the channel state information for the DLCC indicated by the CIF for the CSI included in the DCI Format0. In addition, the mobile station apparatus 102 reports the generated channel state information to the base station apparatus 101 via the PUSCH assigned by the DCI Format0.

Here, whether or not a CIF is included in the DCI Format watched (monitored) by the mobile station apparatus 102 may be set using an RRC (Radio Resource Control) reconfiguration procedure from the base station apparatus 101. Upon receiving a message (RRC reconfiguration message) indicating to change the type of the monitored DCI Format and the meaning of each field of the monitored DCI Format, the mobile station apparatus 102 transmits, to the base station apparatus 101, a message (RRC reconfiguration completion message) indicating that the type of the monitored DCI Format and the meaning of each field of the monitored DCI Format have been changed.

As shown in the foregoing, it is possible to flexibly specify measuring target of the channel state information in a system where two or more bands (e.g., component carriers) can be configured which are measuring (generating) targets of the channel state information by transmitting, from the base station apparatus 101 to the mobile station apparatus 102, a DCI Format0 including a bit field for indicating whether or not reporting of the channel state information is requested, together with an additional bit field (the CIF for the CSI) indicating which component carrier the channel state information is associated with.

The mobile station apparatus 102 may generate (measure) the channel state information for a DLCC indicated by the CIF for the channel state information included in the DCI Format, and whereby the base station apparatus 101 can flexibly specify, for the mobile station apparatus 102, a DLCC for generating the channel state information.

In addition, if the PUSCH is assigned by the DCI Format0 not including the CIF field, the mobile station apparatus 102 may report the channel state information via the PUSCH allocated on the ULCC which has been (preliminarily) configured by the base station apparatus 101, and whereby the base station apparatus 101 can flexibly configure (assign) a transmission resource by which the mobile station apparatus 102 reports the channel state information.

In addition, if the PUSCH is assigned by the DCI Format0 not including the CIF field mapped on a certain DLCC, the mobile station apparatus 102 may report the channel state information via a PUSCH allocated on a ULCC which has been (preliminarily) linked to the certain DLCC by the base station apparatus 101, and whereby the base station apparatus 101 can flexibly configure (assign) a transmission resource by which the mobile station apparatus 102 reports channel state information.

In addition, if the PUSCH is assigned by the DCI Format0 including the CIF field, the mobile station apparatus 102 may report the channel state information via a PUSCH allocated on a ULCC indicated by the CIF, and whereby the base station apparatus 101 can quickly configure (assign) a transmission resource by which the mobile station apparatus 102 transmits channel state information.

Second Embodiment

Next, a second embodiment of the present invention will be described. In the first embodiment of the present invention, description has been provided such that the base station apparatus 101 transmits the DCI Format0 including a bit field for indicating whether or not reporting of the channel state information is requested, together with a bit field (information) included therein, instructing for which DLCC the mobile station apparatus 102 is supposed to generate (measure) the channel state information, and the mobile station apparatus 102 generates the channel state information for the DLCC instructed by the base station apparatus 101 and reports the generated channel state information.

Description will be provided for the second embodiment of the present invention such that the base station apparatus 101 instructs for which DLCC the mobile station apparatus 102 is supposed to generate the channel state information, depending on which region (which a DLCC, or which a SS: a search space) the DCI (or may be the DCI Format0) is supposed to be allocated in. For example, the base station apparatus 101 can instruct for which DLCC the mobile station apparatus 102 is supposed to generate the channel state information, based on the DLCC on which DCI (or may be the DCI Format0) transmitted. In other words, a DLCC for which the mobile station apparatus 102 generates the channel state information can be implicitly specified by the DLCC on which the base station apparatus 101 transmitted the DCI.

In other words, the mobile station apparatus 102 determines (identifies) for which DLCC the channel state information is supposed to be generated, based on the DLCC on which the DCI (or may be the DCI Format0) addressed to its own apparatus has been detected, generates the channel state information for one of the DLCCs, and reports the generated channel state information to the base station apparatus 101. In other words, the mobile station apparatus 102 attempts to detect DCI addressed to its own apparatus which has been allocated on the DLCC (performs blind decoding), generates the channel state information for a DLCC corresponding to the DLCC on which the DCI addressed to its own apparatus has been detected, and reports the generated channel state information to the base station apparatus 101.

In addition, for example, the base station apparatus 101 can instruct for which DLCC the mobile station apparatus 102 is supposed to generate the channel state information, based on a Search Space (SS, also referred to as a search region) on which DCI (or may be the DCI Format0) is transmitted. In other words, the mobile station apparatus 102 can determine (identify) for which DLCC the channel state information is supposed to be generated, based on the search space on which the DCI (or may be the DCI Format0) addressed to its own apparatus has been detected, generate the channel state information for one of the DLCCs, and transmit the generated channel state information to the base station apparatus 101.

A radio communication system according to the second embodiment can be implemented by a configuration similar to that of the radio communication system shown in FIG. 1. First, a case of instructing for which DLCC the mobile station apparatus 102 is supposed to generate the channel state information, based on the DLCC on which the base station apparatus 101 transmits DCI will be described.

FIG. 6 illustrates an exemplary specification of a DLCC based on allocation of DCI according to the second embodiment. FIG. 6 illustrates an example in which, for example, when the base station apparatus 101 communicates with the mobile station apparatus 102 using three DLCCs (e.g., DLCC-0, DLCC-1, and DLCC-2) and two ULCCs (e.g., ULCC-0 and ULCC-1), the base station apparatus 101 specifies, to the mobile station apparatus 102, a DLCC for generating channel state information.

The DLCC illustrated on the left side of FIG. 6 indicates a DLCC (or may be a DLCC on which the mobile station apparatus 102 detects DCI addressed to its own apparatus) on which the base station apparatus 101 transmits DCI, and CQI reference resources illustrated on the right side of FIG. 6 indicate a DLCC for the mobile station apparatus 102 to generate the channel state information corresponding to the DLCC (or may be the DLCC on which the mobile station apparatus 102 detects DCI addressed to its own apparatus) on which the base station apparatus 101 transmits DCI. In other words, if the CQI request field included in the DCI Format0 from the base station apparatus 101 is set to "1", a correspondence (correspondence table, linking) is shown, instructing for which DLCC the mobile station apparatus 102 is supposed to generate the channel state information.

For example, as shown in FIG. 6, upon detecting the DCI addressed to its own apparatus which has been transmitted on the DLCC-0, and if the CQI request field in the DCI is set to "1" by the base station apparatus 101, the mobile station apparatus 102 generates the channel state information for the DLCC-0, and reports the generated channel state information. In addition, for example, upon detecting the DCI addressed to its own apparatus which has been transmitted on the DLCC-1, and if the CQI request field in the DCI is set to "1" by the base station apparatus 101, the mobile station apparatus 102 generates the channel state information for the DLCC-2 and reports the generated channel state information. In addition, for example, upon detecting the DCI addressed to its own apparatus which has been transmitted on the DLCC-2, and if the CQI request field in the DCI is set to "1" by the base station apparatus 101, the mobile station apparatus 102 generates the channel state information for the DLCC-1 and reports the generated channel state information.

Here, the mobile station apparatus 102, after having checked the DLCC with DCI transmitted therein, may generate the channel state information for the DLCC with DCI transmitted therein, and report the generated channel state information. In addition, after having preliminarily generated the channel state information for a plurality of DLCCs and checked the DLCC with DCI transmitted therein, the mobile station apparatus 102 may report the channel state information corresponding to the DLCC with DCI allocated therein.

In addition, the correspondence (correspondence table, linking) between the DLCC on which the base station apparatus 101 transmits DCI and the DLCC for the mobile station apparatus 102 to generate the channel state information may be set by the base station apparatus 101 to be Cell-specific or UE-specific. In other words, the base station apparatus 101 and the mobile station apparatus 102 are caused to share the correspondence before the DCI Format0 is transmitted from the base station apparatus 101.

In addition, correspondence (correspondence table, linking) between the DLCC on which the base station apparatus 101 transmits DCI and the DLCC for the mobile station apparatus 102 to generate the channel state information may be set by the base station apparatus 101 in a semi-static or a dynamic manner. In addition, the DLCC on which the base station apparatus 101 transmits DCI and the DLCC for the mobile station apparatus 102 to generate the channel state information need not be identical. Even if the DLCC on which the base station apparatus 101 transmits DCI is not identical to the DLCC for the mobile station apparatus 102 to generate the channel state information, a similar effect can be obtained.

Figure 7:
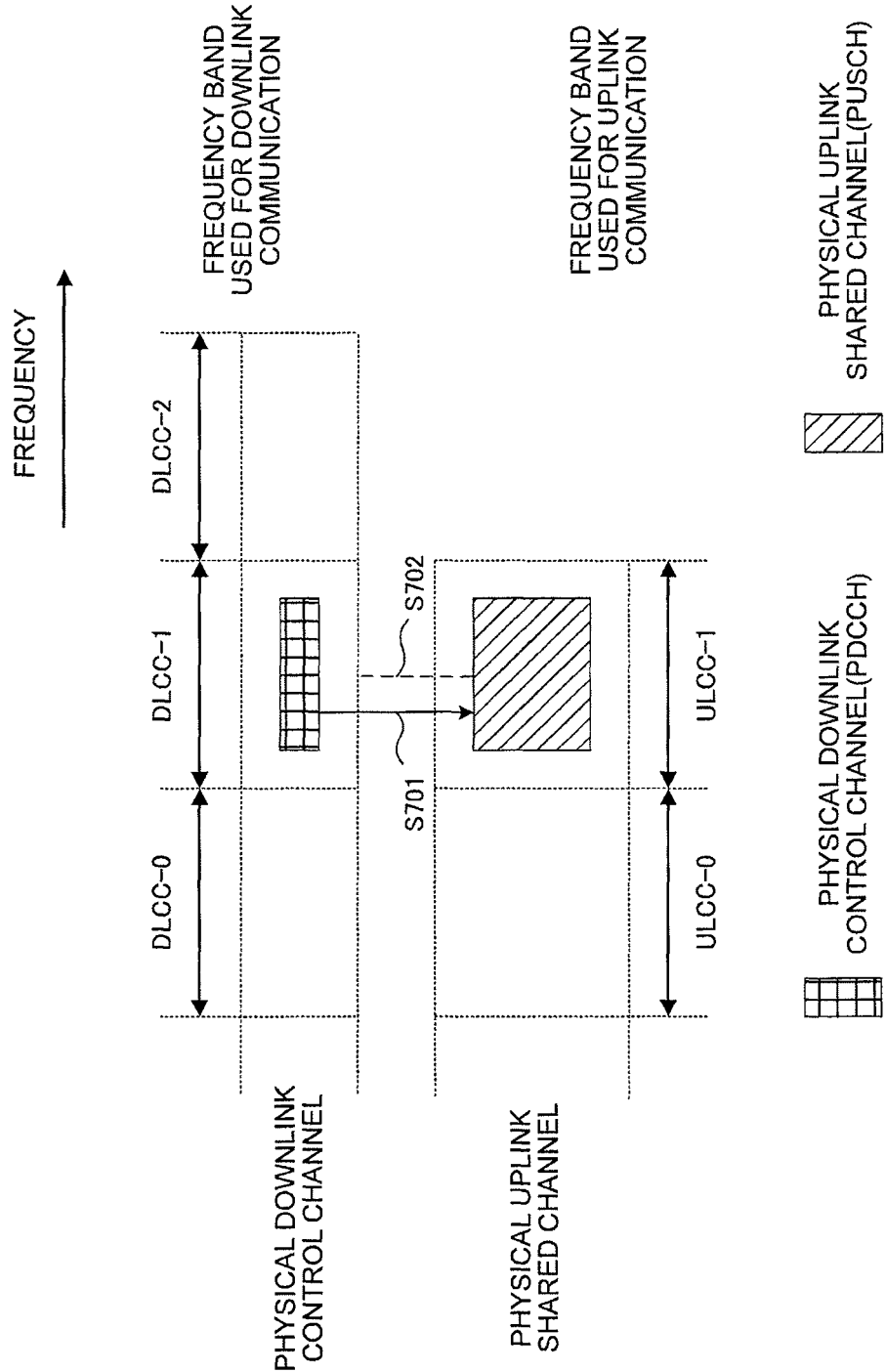
FIG. 7 illustrates an exemplary reporting procedure of channel state information according to an embodiment of the present invention.

FIG. 7 illustrates an exemplary reporting procedure of the channel state information according to the second embodiment. First, the base station apparatus 101 notifies the mobile station apparatus 102 of DCI including uplink-related information via a DLCC corresponding to the DLCC for which acquisition of the channel state information is desired. In other words, the base station apparatus 101 transmits DCI (DCI Format0) on a DLCC corresponding to the DLCC for which acquisition of the channel state information is desired, and transmits it to the mobile station apparatus 102. In addition, the base station apparatus 101 specifies a state to report the channel state information in the CQI request field included in the DCI (sets the CQI request field to "1").

In FIG. 7, the base station apparatus 101 notifies DCI via a DLCC corresponding to the DLCC-1 for which acquisition of the channel state information is desired (step S701). It is shown in FIG. 7 that the base station apparatus 101 notifies the mobile station apparatus 102 of DCI as a DLCC corresponding to the DLCC-1 for which acquisition of the channel state information is desired, via the DLCC-1. The mobile station apparatus 102 performs blind decoding in the DLCC-1 and attempts to detect DCI addressed to its own apparatus. The mobile station apparatus 102 which has detected, in the DLCC-1, DCI addressed to its own apparatus transmits PUSCH on one of ULCCs, referring to information related to uplink assignment included in the DCI (hopping flag, RB assignment information (RB assignment information for a PUSCH), CIF if CIF is included). In FIG. 7, the DCI notified from the base station apparatus 101 via the DLCC-1 indicates that an uplink transmission resource in the ULCC-1 has been specified.

The mobile station apparatus 102 which has detected the DCI addressed to its own apparatus in the DLCC-1 identifies, in the CQI request field included in the DCI format, whether it is in a state to report the channel state information. Here, if the CQI request field from the base station apparatus 101 is set to "1", the mobile station apparatus 102 generates the channel state information for the DLCC (here, DLCC-1) corresponding to the DLCC-1 on which DCI is transmitted, and reports the generated channel state information. Here, the mobile station apparatus 102 reports the channel state information using a part or all of the uplink transmission resource on the ULCC-1 assigned by the base station apparatus 101 (step S702). For example, the mobile station apparatus 102 maps the channel state information generated on the PUSCH in the ULCC-1 assigned by the base station apparatus 101, and reports it to the base station apparatus 101.

As thus described, it is possible to flexibly specify, in a system where two or more bands (e.g., component carriers) can be configured which are measuring (generating) targets of the channel state information, a measuring target of the channel state information, by implicitly instructing for which DLCC the mobile station apparatus 102 is supposed to transmit the channel state information, based on the DLCC (it may also be DLCC in which the DCI addressed to its own apparatus has been detected by the mobile station apparatus 102) on which the base station apparatus 101 transmits DCI.

In addition, the mobile station apparatus 102 may generate the channel state information for the DLCC corresponding to the DLCC on which the DCI addressed to its own apparatus has been detected, and whereby the base station apparatus 101 can flexibly specify a DLCC generating the channel state information for the mobile station apparatus 102. Furthermore, it is not necessary to explicitly indicate a DLCC for generating the channel state information by the base station apparatus 101 (preparation of a bit field for indicating a DLCC is not required), and whereby it is possible to specify, for the mobile station apparatus 102, a DLCC for effectively generating the channel state information.

Subsequently, a case will be described where the base station apparatus 101 instructs for which DLCC the mobile station apparatus 102 is supposed to generate the channel state information, according to the search space on which DCI (or may be the DCI Format0) is transmits. Here, the search space refers to a range (a region) where the PDCCH may be formed in which the mobile station apparatus 102 performs blind decoding (attempts to decode the PDCCH addressed to its own apparatus). In other words, the mobile station apparatus 102 performs blind decoding in the search space to detect the PDCCH addressed to its own apparatus.

FIG. 8 is a schematic view illustrating a structure of a PDCCH resource in a certain subframe (PDCCH resource region, shown by the lattice pattern). In FIG. 8, the mobile station apparatus 102 performs blind decoding (performs searching, attempts to detect the PDCCH addressed to its own apparatus) in the SS-0 (shown by vertical lines), the SS-1 (shown by right-up diagonal lines), and the SS-2 (shown by left-up diagonal lines) of the PDCCH resource region. Here, the search space may be configured by the base station apparatus 101 to be Cell-specific or UE-specific.

In addition, the search space may be calculated by the mobile station apparatus 102 based on parameters (e.g., subframe index in which the PDCCH is transmitted, DLCC-specific index provided to each C-RNTI or DLCC, etc) set by the base station apparatus 101. The base station apparatus 101 and the mobile station apparatus 102 are caused to share a search space before the mobile station apparatus 102 performs blind decoding in the search space.

FIG. 9 illustrates another exemplary specification of a DLCC according to allocation of DCI according to the second embodiment. FIG. 9 illustrates an example in which the base station apparatus 101 specifies a DLCC for generating the channel state information for the mobile station apparatus 102 when, for example, the base station apparatus 101 communicates with the mobile station apparatus 102 using three DLCCs (e.g., DLCC-0, DLCC-1, and DLCC-2) and two ULCCs (e.g., ULCC-0 and ULCC-1).

The SS (search space) illustrated on the left side of FIG. 9 indicates a search space (it may also be a search space in which the mobile station apparatus 102 detects DCI addressed to its own apparatus) on which the base station apparatus 101 transmits DCI, and the CQI reference resources illustrated on the right side of FIG. 9 indicate a DLCC for the mobile station apparatus 102 to generate the channel state information, based on the search space (it may also be a search space in which the mobile station apparatus 102 detects DCI addressed to its own apparatus) on which the base station apparatus 101 transmits DCI. In other words, correspondence (correspondence table, linking) is shown instructing for which DLCC the mobile station apparatus 102 is supposed to generate the channel state information, when the CQI request field included in the DCI Format0 from the base station apparatus 101 is set to "1".

For example, as shown in FIG. 9, upon detecting the DCI addressed to its own apparatus which has been transmitted on the SS-0, and if the CQI request field in the DCI is set to "1" by the base station apparatus 101, the mobile station apparatus 102 generates the channel state information for the DLCC-0 and reports the generated channel state information. In addition, for example, upon detecting the DCI addressed to its own apparatus which has been transmitted on the SS-1, and if the CQI request field in the DCI is set to "1" by the base station apparatus 101, the mobile station apparatus 102 generates the channel state information for the DLCC-2 and reports the generated channel state information. In addition, for example, upon detecting the DCI addressed to its own apparatus which has been transmitted on the SS-2, and if the CQI request field in the DCI is set to "1" by the base station apparatus 101, the mobile station apparatus 102 generates the channel state information for the DLCC-1 and reports the generated channel state information.

Here, correspondence (correspondence table, linking) between the search space on which the base station apparatus 101 transmits DCI and the DLCC for the mobile station apparatus 102 to generate the channel state information may be configured by the base station apparatus 101 to be Cell-specific or UE-specific. In addition, correspondence (correspondence table, linking) between the search space on which the base station apparatus 101 transmits DCI and the DLCC for the mobile station apparatus 102 to generate the channel state information may be calculated by the mobile station apparatus 102 based on parameters (e.g., subframe index in which a PDCCH is transmitted, DLCC-specific index provided to each C-RNTI, DLCC, etc) set by the base station apparatus 101.

Figure 10:
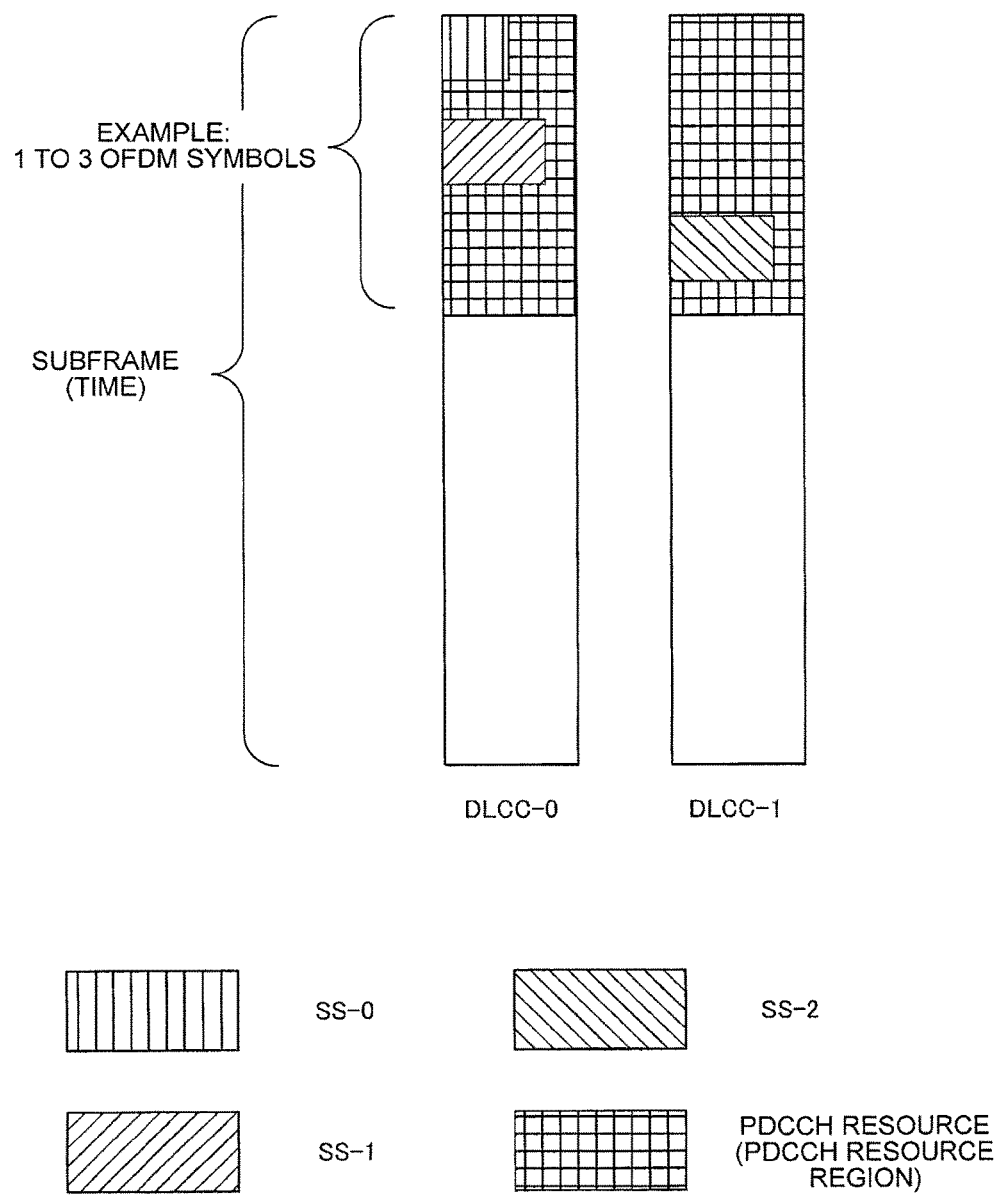
FIG. 10 illustrates another exemplary structure of a physical downlink control channel according to an embodiment of the present invention.

FIG. 10 is another schematic view illustrating a structure of a PDCCH resource (PDCCH resource region shown by the lattice pattern) in a certain subframe. As shown in FIG. 10, the base station apparatus 101 may transmits DCI (or may be the DCI Format0) across a plurality of DLCCs. In other words, the mobile station apparatus 102 can perform, across a plurality of DLCCs, blind decoding in the search space on which the DCI addressed to its own apparatus may be transmitted, and identify (determine) a DLCC for generating the channel state information based on the search space in which the DCI addressed to its own apparatus has been detected. In other words, correspondence (correspondence table, linking) between the search space on which the base station apparatus 101 transmits DCI (it may also be the search space in which the mobile station apparatus 102 detects DCI addressed to its own apparatus) and the DLCC for the mobile station apparatus 102 to generate the channel state information may be associated across a plurality of DLCCs.

In FIG. 10, the mobile station apparatus 102 performs blind decoding in the SS-0 (shown by vertical lines) and the SS-1 (shown by right-up diagonal lines) configured in the PDCCH resource of the DLCC-0 (PDCCH resource region, shown by the lattice pattern). In addition, the mobile station apparatus 102 performs blind decoding in the SS-2 (shown by left-up diagonal lines) configured in the PDCCH resource of the DLCC-1 (PDCCH resource region, also shown by the lattice pattern).

For example, upon detecting the DCI addressed to its own apparatus which has been transmitted on the SS-0, and if the CQI request field in the DCI is set to "1" by the base station apparatus 101, the mobile station apparatus 102 generates the channel state information for the DLCC-0 and reports the generated channel state information. In addition, for example, upon detecting the DCI addressed to its own apparatus which has been transmitted on the SS-1, and if the CQI request field in the DCI is set to "1" by the base station apparatus 101, the mobile station apparatus 102 generates the channel state information for the DLCC-2 and reports the generated channel state information. In addition, for example, upon detecting the DCI addressed to its own apparatus which has been transmitted on the SS-2, and if the CQI request field in the DCI is set to "1" by the base station apparatus 101, the mobile station apparatus 102 generates channel state information for the DLCC-1 and reports the generated channel state information.

Here, it is assumed that the correspondence between the search space on which the base station apparatus 101 transmits DCI (it may be the search space in which the mobile station apparatus 102 detects DCI addressed to its own apparatus) and the DLCC for the mobile station apparatus 102 to generate the channel state information is a correspondence such as shown in FIG. 9.

Here, the correspondence between the search space on which the base station apparatus 101 transmits DCI and the DLCC for the mobile station apparatus to generate the channel state information may be such that DLCCs for generating the channel state information are respectively associated with different search spaces. In addition, the correspondence between the search space on which the base station apparatus 101 transmits DCI and the DLCC for the mobile station apparatus 102 to generate the channel state information may be such that a same DLCC for generating the channel state information is associated with different search spaces.

In FIG. 10, for example, if the CQI request field in the DCI transmitted on the SS-1 by the base station apparatus 101 is set to "1", the mobile station apparatus 102 generates the channel state information for the DLCC-1 and reports the generated channel state information. In addition, if the CQI request field in the DCI transmitted on the SS-2 by the base station apparatus 101 is set to "1", the mobile station apparatus 102 may generate the channel state information for a same DLCC-1 and report the generated the channel state information.

Here, the reporting procedure of identifying (determining), by the search space on which the base station apparatus 101 transmits DCI (by the mobile station apparatus 102 detecting the DCI addressed to its own apparatus), the DLCC for the mobile station apparatus 102 to generate the channel state information, and reporting the channel state information for the identified DLCC can be realized in a procedure similar to the reporting procedure described in FIG. 7.

Furthermore, the DLCC and the search space on which the base station apparatus 101 transmits DCI and the DLCC for the mobile station apparatus 102 to generate the channel state information may be associated with each other. In other words, the correspondences shown in FIGS. 6 and 9 may be combined for use by providing an index to the search space for each DLCC.

For example, upon detecting the DCI addressed to its own apparatus which has been transmitted on the SS-0 of the DLCC-0, and if the CQI request field in the DCI is set to "1" by the base station apparatus 101, the mobile station apparatus 102 may generate the channel state information for the DLCC-0 and report the generated channel state information. In addition, for example, upon detecting the DCI addressed to its own apparatus which has been transmitted on the SS-0 of the DLCC-1, and if the CQI request field in the DCI is set to "1" by the base station apparatus 101, the mobile station apparatus 102 may generate the channel state information for the DLCC-1 and report the generated channel state information. Even if the correspondence between the region on which the base station apparatus 101 transmits DCI and the DLCC for the mobile station apparatus 102 to generate the channel state information is provided in this manner, a similar effect can be obtained.

As thus described, it is possible to flexibly specify measuring target of the channel state information in a system where two or more bands (e.g., component carriers) can be configured which are measuring (generating) targets of the channel state information, by implicitly instructing for which DLCC the mobile station apparatus 102 is supposed to transmit the channel state information, based on the search space on which the base station apparatus 101 transmits DCI (it may also be the search space in which the mobile station apparatus 102 detects DCI addressed to its own apparatus).

In addition, the mobile station apparatus 102 may generate the channel state information for the DLCC corresponding to the search space in which the DCI addressed to its own apparatus has been detected, and whereby the base station apparatus 101 can flexibly specify a DLCC for generating the channel state for the mobile station apparatus 102. Furthermore, it is not necessary to explicitly indicate a DLCC for generating the channel state information by the base station apparatus 101 (preparation of a bit field for indicating a DLCC is not required), and whereby it is possible to specify, for the mobile station apparatus 102, a DLCC for effectively generating the channel state information.

As shown in the foregoing, the base station apparatus 101 may transmits DCI on a certain region (it may be that the mobile station apparatus 102 detects DCI addressed to its own apparatus in a certain region) and implicitly instruct for which DLCC the mobile station apparatus 102 is supposed to transmit the channel state information, and whereby it is possible to flexibly specify a measuring target of the channel state information in a system where two or more bands (e.g., component carriers) can be configured which are measuring (generating) targets of the channel state information.

In addition, the mobile station apparatus 102 may generate the channel state information for the DLCC based on the region in which the DCI addressed to its own apparatus has been detected, and whereby the base station apparatus 101 can flexibly configure the DLCC for generating the channel state information for the mobile station apparatus 102. Furthermore, it is not necessary to explicitly specify a DLCC for generating the channel state information (it is not necessary to prepare a bit field for specifying a DLCC) by the base station apparatus 101, and it is possible to specify, for the mobile station apparatus 102, a DLCC for effectively generating the channel state information.

Third Embodiment

Next, a third embodiment of the present invention will be described. In the first embodiment of the present invention, description has been provided such that the base station apparatus 101 transmits the DCI Format0 including a bit field for indicating whether or not reporting of the channel state information is requested, together with a bit field (information) included therein, instructing for which DLCC the mobile station apparatus 102 is supposed to generate (measure) the channel state information, and the mobile station apparatus 102 generates the channel state information for the DLCC instructed by the base station apparatus 101 and reports the generated channel state information.

Description will be provided for the third embodiment of the present invention such that the base station apparatus 101 instructs for which DLCC the mobile station apparatus 102 is supposed to generate the channel state information, based on an uplink transmission resource to be assigned to the mobile station apparatus 102. For example, the base station apparatus 101 assigns a transmission resource of an uplink to the mobile station apparatus 102, and the mobile station apparatus 102 generates the channel state information for the DLCC corresponding to the ULCC (forming a pair with the ULCC) on which the uplink transmission resource has been assigned by the base station apparatus 101 (to put it another way, an uplink transmission resource has been mapped), and reports the generated channel state information.

A radio communication system according to the third embodiment can be implemented by a configuration similar to that of the radio communication system shown in FIG. 1. FIG. 11 illustrates an exemplary pair (also referred to as CC pair, correspondence of CC, or a linking of CC) of a downlink component carrier (DLCC) and an uplink component carrier (ULCC) according to the third embodiment. FIG. 11 illustrates an example in which the base station apparatus 101 specifies a DLCC for generating the channel state information for the mobile station apparatus 102 when, for example, the base station apparatus 101 communicates with the mobile station apparatus 102 using three DLCCs (e.g., DLCC-0, DLCC-1, and DLCC-2) and two ULCCs (e.g., ULCC-0 and ULCC-1).

The pair (index) shown in FIG. 11 indicates a pair (correspondence or linking) of a DLCC for the mobile station apparatus 102 to generate the channel state information and a ULCC which the base station apparatus 101 assigns the uplink transmission resource to the mobile station apparatus 102. The base station apparatus 101 may configure a pair of DLCC and ULCC by notifying the mobile station apparatus 102 of the pair (index). The base station apparatus 101 can configure, for the mobile station apparatus 102, a pair of DLCC and ULCC to be Cell-specific or UE-specific.

In addition, the base station apparatus 101 may configure a pair of DLCC and ULCC for the mobile station apparatus 102 in a semi-static or dynamic manner. In addition, the base station apparatus 101 may transmit parameters (e.g., subframe index in which a PDCCH is transmitted, DLCC-specific index provided to each C-RNTI or DLCC, ULCC-specific index provided to each ULCC, etc) for configuring a pair of DLCC and ULCC to the mobile station apparatus 102, and a pair of DLCC and ULCC may be calculated by the mobile station apparatus 102. The base station apparatus 101 and the mobile station apparatus 102 are caused to share a pair of ULCC and DLCC before the base station apparatus 101 notifies the DCI.

In addition, the DLCC shown in FIG. 11 indicates a DLCC for generating the channel state information by the mobile station apparatus 102, which corresponds to the ULCC on which the uplink transmission resource is assigned by the base station apparatus 101. In addition, the ULCC shown in FIG. 11 indicates a ULCC on which the uplink transmission resource is assigned by the base station apparatus 101. In other words, FIG. 11 illustrates the correspondence (correspondence table, linking) instructing for which DLCC the mobile station apparatus 102 is supposed to generate the channel state information, if the CQI request field included in the DCI Format0 from the base station apparatus 101 is set to "1".

Here, the uplink transmission resource which the base station apparatus 101 assigns to the mobile station apparatus 102 includes, for example, the PUSCH resource or the PUCCH resource. As described above, the base station apparatus 101 can assign the uplink transmission resource based on the DCI Format0 including the CIF field. In addition, the base station apparatus 101 can assign the uplink transmission resource based on the DCI Format0 not including the CIF field. The mobile station apparatus 102 generates the channel state information for the DLCC corresponding to the ULCC on which the PUSCH resource or the PUCCH resource has been assigned by the base station apparatus 101, and reports the generated channel state information to the base station apparatus 101.

For example, in FIG. 11, if the uplink transmission resource on the ULCC-0 has been assigned by the base station apparatus 101, the mobile station apparatus 102 generates the channel state information for the DLCC-0, and reports the generated channel state information. In addition, for example, if the uplink transmission resource on the ULCC-1 has been assigned by the base station apparatus 101, the mobile station apparatus 102 generates the channel state information for the DLCC-1 and reports the generated channel state information. In addition, for example, if the uplink transmission resource on the ULCC-1 has been assigned by the base station apparatus 101, the mobile station apparatus 102 generates the channel state information for the DLCC-2 and reports the generated channel state information. Here, the CQI request field included in the DCI Format0 transmitted from the base station apparatus 101 is set to "1".

Figure 12:
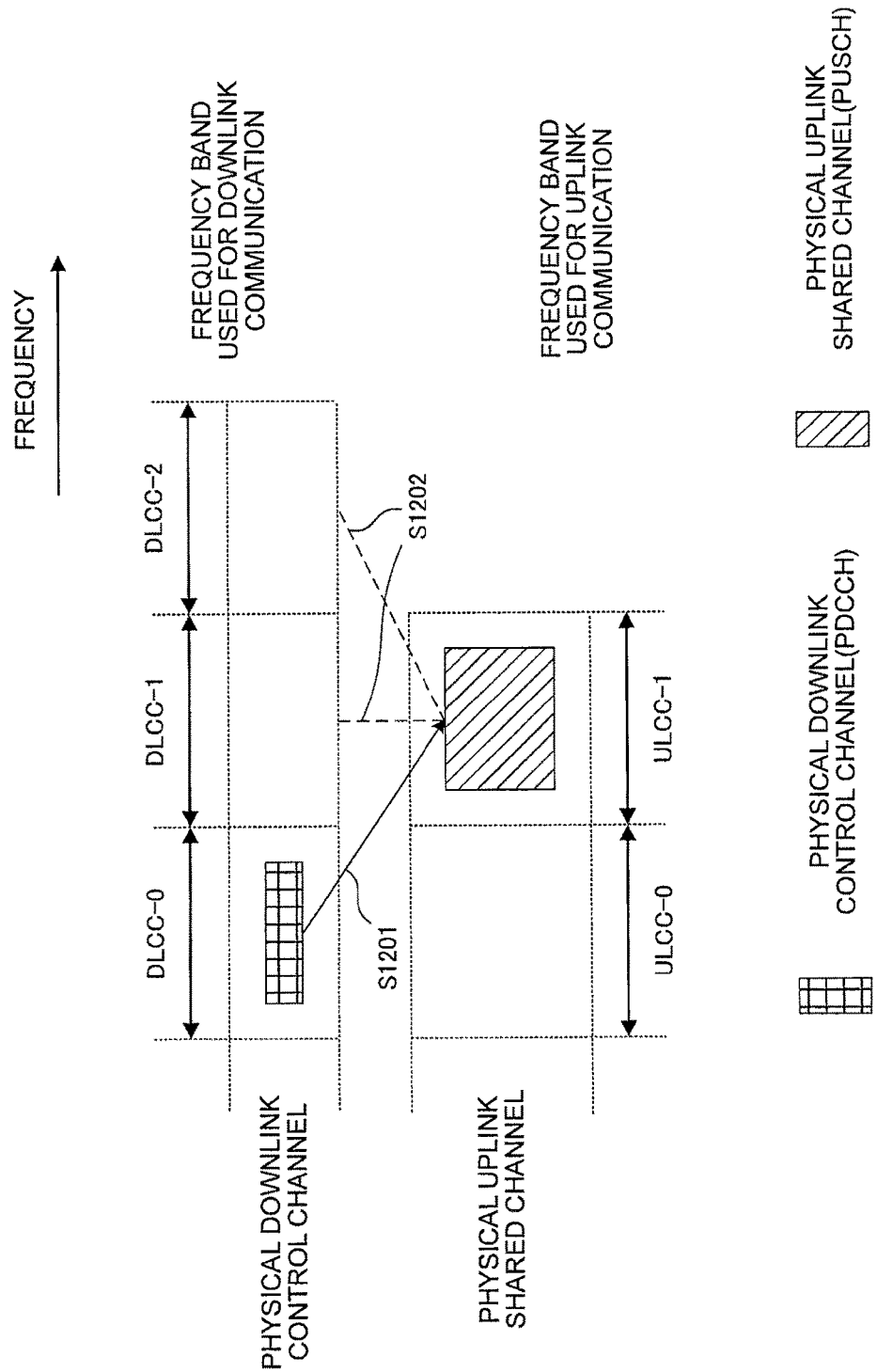
FIG. 12 illustrates another exemplary reporting procedure of channel state information according to an embodiment of the present invention.

FIG. 12 illustrates an exemplary reporting procedure of the channel state information according to the third embodiment. The base station apparatus 101 notifies the mobile station apparatus 102 of the DCI including uplink-related information for the ULCC forming a pair with (corresponding to) the DLCC for which acquisition of the channel state information is desired. In other words, the base station apparatus 101 assigns, to the mobile station apparatus 102, the uplink transmission resource on the ULCC forming a pair with the DLCC for which acquisition of the channel state information is desired.

For example, the base station apparatus 101 assigns the uplink transmission resource on the ULCC forming a pair with the DLCC based on the resource assignment information included in the DCI Format0, and further, specifies a state to report the channel state information in the CQI request field in the DCI Format 0 (sets the CQI request field to 1).

In FIG. 12, the base station apparatus 101 assigns the uplink transmission resource on the ULCC-1 corresponding to the DLCC-1 and the DLCC-2 for which acquisition of the channel state information is desired (step 1201). FIG. 12 illustrates that the base station apparatus 101 assigns the uplink transmission resource on the ULCC-1 based on the DCI (or may be the DCI Format0) mapped on the DLCC-0. The mobile station apparatus 102 performs blind decoding in the DLCC-0, and attempts to detect DCI addressed to its own apparatus. The mobile station apparatus 102 which has detected the DCI addressed to its own apparatus in the DLCC-0 transmits the PUSCH in one of ULCCs, referring to information related to the uplink assignment included in the DCI Format 0 (hopping flag, RB assignment information (e.g., RB assignment information for a PUSCH, RB assignment information for a PUCCH), CIF if CIF is included). FIG. 12 illustrates that the DCI notified from the base station apparatus 101 via the DLCC-0 has specified therein the uplink transmission resource on the ULCC-1.

The mobile station apparatus 102 which has detected the DCI addressed to its own apparatus in the DLCC-0 identifies whether or not the CQI request field included in the DCI Format 0 is in a state to report the channel state information. Here, if the CQI request field from the base station apparatus 101 is set to "1", the mobile station apparatus 102 generates the channel state information for the DLCC-1 and/or the DLCC-2 corresponding to the ULCC-1 which the base station apparatus 101 has assigned the uplink transmission resource, and reports the channel state information, using a part or all of the assigned uplink transmission resource (step S1202). For example, the mobile station apparatus 102 maps the generated channel state information to the PUSCH resource on the ULCC-1 assigned by the base station apparatus 101, and reports it to the base station apparatus 101.

As shown in the foregoing, the base station apparatus 101 may assign the uplink transmission resource on the ULCC and implicitly instruct for which DLCC the mobile station apparatus 102 is supposed to transmit the channel state information, and whereby it is possible to flexibly specify a measuring target of the channel state information in a system where two or more bands (e.g., component carriers) can be configured which are measuring (generating) targets of the channel state information.

In addition, the mobile station apparatus 102 may generate the channel state information for the DLCC corresponding to the ULCC which the base station apparatus 101 has assigned the uplink transmission resource, and whereby the base station apparatus 101 can flexibly specify a DLCC for which the channel state information is generated for the mobile station apparatus 102. Furthermore, it is not necessary to explicitly indicate a DLCC for generating the channel state information by the base station apparatus 101 (preparation of a bit field for indicating a DLCC is not required), and whereby it is possible to specify, for the mobile station apparatus 102, a DLCC for effectively generating the channel state information.

Although the foregoing description has explained a method of specifying a single DLCC for the mobile station apparatus 102 to generate the channel state information, in association with a single ULCC in which the base station apparatus 101 assigns a single uplink transmission resource, the method is not limited thereto. For example, a DLCC for the mobile station apparatus 102 to generate the channel state information may be specified by associating a plurality of uplink transmission resources in a single ULCC with a plurality of DLCCs. In addition, a similar effect can be obtained by associating a plurality of uplink transmission resources in a plurality of ULCCs with a plurality of DLCCs to specify a DLCC for the mobile station apparatus 102 to generate the channel state information.

Fourth Embodiment

Next, a fourth embodiment of the present invention will be described. In the first embodiment of the present invention, description has been provided such that the base station apparatus 101 transmits the DCI Format0 including a bit field for indicating whether or not reporting of the channel state information is requested, together with a bit field (information) included therein, instructing for which DLCC the mobile station apparatus 102 is supposed to generate (measure) the channel state information, and the mobile station apparatus 102 generates the channel state information for the DLCC instructed by the base station apparatus 101 and reports the generated channel state information.

Description will be provided for the fourth embodiment of the present invention such that the base station apparatus 101 instructs for which DLCC the mobile station apparatus 102 is supposed to generate the channel state information, according to the CIF indicating the ULCC on which the PUSCH to be assigned to the mobile station apparatus 102 is mapped. For example, the base station apparatus 101 notifies the CIF indicating the ULCC on which the PUSCH to be assigned to the mobile station apparatus 102 is mapped, and the mobile station apparatus 102 generates the channel state information for the DLCC based on the CIF notified by the base station apparatus 101 (to put it another way, a DLCC corresponding to the ULCC indicated by the CIF), and reports the generated channel state information.

Figure 13:
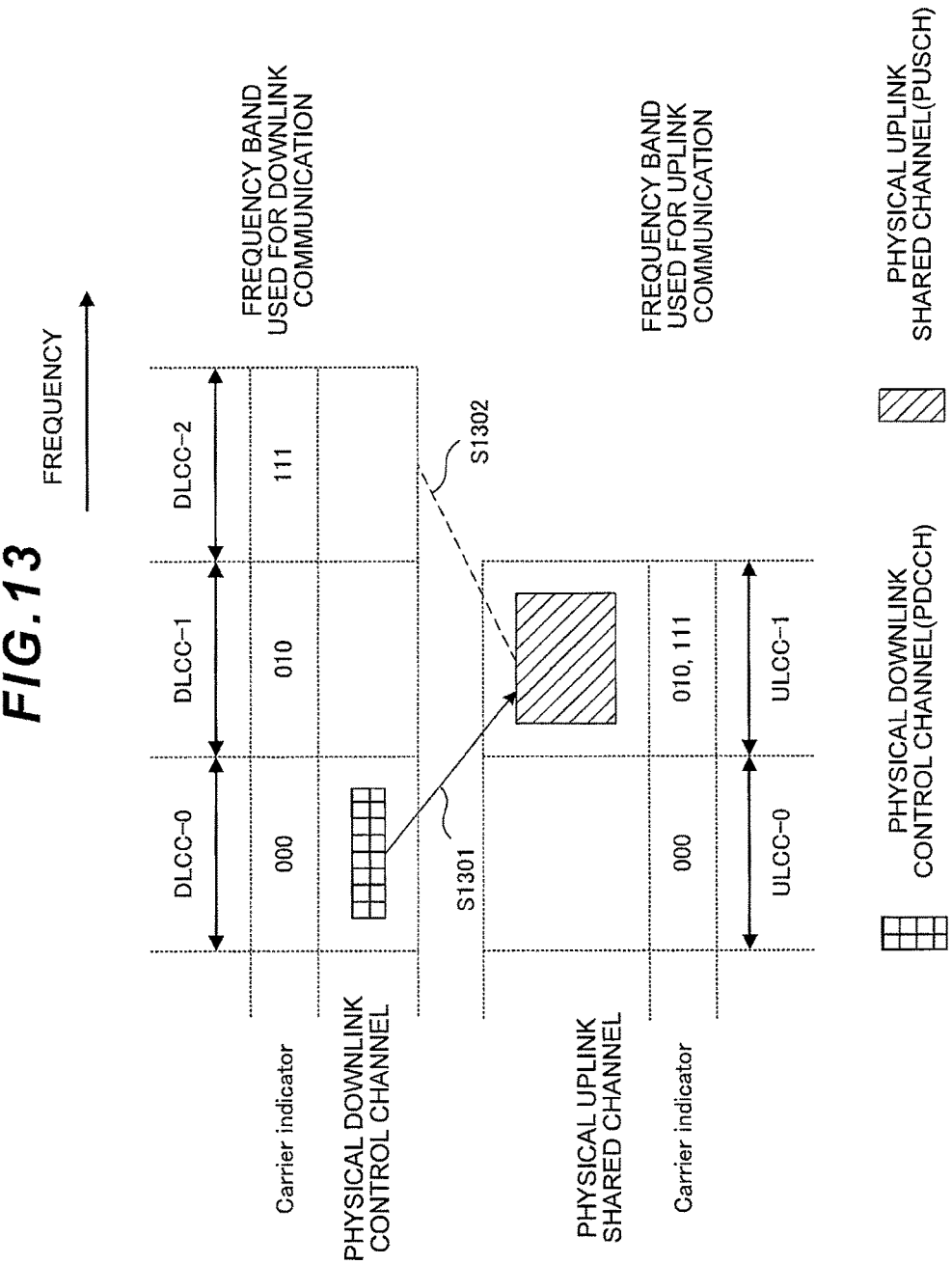
FIG. 13 illustrates another exemplary reporting procedure of channel state information according to an embodiment of the present invention.

A radio communication system according to the fourth embodiment can be implemented by a configuration similar to that of the radio communication system shown in FIG. 1. FIG. 13 illustrates an exemplary reporting procedure of the channel state information according to the present embodiment. FIG. 13 illustrates an example in which the base station apparatus 101 specifies a DLCC for generating the channel state information for the mobile station apparatus 102 when, for example, the base station apparatus 101 communicates with the mobile station apparatus 102 using three DLCCs (e.g., DLCC-0, DLCC-1, and DLCC-2) and two ULCCs (e.g., ULCC-0 and ULCC-1).

In FIG. 13, each of the DLCCs and ULCCs has at least one Carrier Indicator (also referred to as carrier index) mapped (provided) thereto. FIG. 13 illustrates an example in which 000 is mapped to DLCC-0, 010 is mapped to DLCC-1, and 111 is mapped to DLCC-2. In addition, an example is illustrated in which 000 is mapped to the ULCC-0, and 010 and/or 111 is mapped to ULCC-1. In FIG. 13, although carrier indicators as described above are mapped to the DLCCs and the ULCCs as an example, it is needless to say that carrier indicators to be mapped to the DLCCs and the ULCCs are not limited thereto.

Here, the base station apparatus 101 may configure, for the mobile station apparatus 102, the mapping between the DLCCs and the ULCCs, and the carrier indicators to be Cell-specific or UE-specific. The base station apparatus 101 and the mobile station apparatus 102 are supposed to have shared the mapping between the DLCCs and the ULCCs, and the carrier indicators before the base station apparatus 101 notifies the DCI Format0. In addition, the base station apparatus 101 may set, for the mobile station apparatus 102, the mapping between the DLCCs and the ULCCs, and the carrier indicators in a semi-static or a dynamic manner.

In FIG. 13, a carrier indicator (a value of a carrier indicator) mapped to a DLCC and a carrier indicator (a value of a carrier indicator) mapped to a ULCC are associated with each other. In other words, a DLCC and a ULCC having a same carrier indicator (having a same value of a carrier indicator) are associated with each other. In other words, a DLCC and a ULCC having mapped thereto a same carrier indicator are associated with each other.

In FIG. 13, the DLCC-0 having carrier indicator 000 mapped thereto and the ULCC-0 having the carrier indicator 000 mapped thereto are associated with each other. In addition, the DLCC-1 having the carrier indicator 010 mapped thereto and the ULCC-1 having the carrier indicator 010 (carrier indicator 010 and/or 111) mapped thereto are associated with each other. In addition, the DLCC-2 having the carrier indicator 111 mapped thereto and the ULCC-1 having the carrier indicator 111 (carrier indicator 010 and/or 111) mapped thereto are associated with each other.

The base station apparatus 101 assigns the uplink transmission resource to the mobile station apparatus 102 using the downlink control information format including a CIF field. For example, the base station apparatus 101 assigns the uplink transmission resource to the mobile station apparatus 102 using the downlink control information format as illustrated on the right side of FIG. 4. As described above, the base station apparatus 101 can indicate, to the mobile station apparatus 102, a ULCC having allocated thereto the uplink transmission resource (e.g., the PUSCH resource), by transmitting the downlink control information format together with CIF included therein. In other words, the base station apparatus 101 can indicate, to the mobile station apparatus 102, a ULCC having a carrier indicator mapped thereto, by indicating a carrier indicator (a value thereof) using the CIF.

Referring to FIG. 13, an exemplary reporting procedure of channel state information according to the third embodiment will be described. The base station apparatus 101 notifies the mobile station apparatus 102 of DCI including uplink-related information for a ULCC having mapped thereto a same carrier indicator (a value of which) as that of the DLCC for which acquisition of the channel state information is desired. To put it another way, the base station apparatus 101 notifies the mobile station apparatus 102 of the downlink control information format including a carrier indicator (a value of which) mapped to a DLCC for which acquisition of the channel state information is desired. For simplicity in the following, the downlink control information format is denoted as the DCI Format0.

For example, the base station apparatus 101 notifies the mobile station apparatus 102 of a ULCC having mapped thereto a same carrier indicator (a value of which) as that of the DLCC for which acquisition of channel state information is desired, using the CIF included in the DCI Format0. In this occasion, the base station apparatus 101 specifies a state to report the channel state information in the CQI request field in the DCI Format 0 (the CQI request field is set to "1").

In FIG. 13, for example, the base station apparatus 101 assigns the uplink transmission resource of the ULCC-1 having mapped thereto a same carrier indicator (111) as the carrier indicator (111) mapped to the DLCC-2 for which acquisition of the channel state information is desired (step S1301). For example, the base station apparatus 101 sets the value of the CIF included in the DCI Format0 to 111 and assigns the PUSCH resource to the mobile station apparatus 102. The mobile station apparatus 102 performs blind decoding in the DLCC-0 and attempts to detect DCI addressed to its own apparatus. The mobile station apparatus 102 which has detected the DCI addressed to its own apparatus in the DLCC-0 transmits the PUSCH in one of the ULCCs, referring to information related to an uplink assignment included in the DCI Format 0 (hopping flag, RB assignment information (e.g., RB assignment information for a PUSCH), CIF). FIG. 13 illustrates that to the DCI notified from the base station apparatus 101 via the DLCC-0, an uplink transmission resource in the ULCC-1 is specified.

The mobile station apparatus 102 identifies whether or not the CQI request field included in the DCI Format 0 notified via the DLCC-0 is in a state to report the channel state information. Here, if the CQI request field is in a state to report the channel state information, the mobile station apparatus 102 generates the channel state information for the DLCC having mapped thereto a same carrier indicator as that of the ULCC indicated by the CIF from the base station apparatus 101, and reports the channel state information, using apart or all of the assigned uplink transmission resource (step S1302).

The mobile station apparatus 102 which has detected the DCI addressed to its own apparatus in the DLCC-0 identifies whether the CQI request field included in the DCI Format 0 is in a state to report the channel state information. Here, if the CQI request field from the base station apparatus 101 is set to "1", the mobile station apparatus 102 generates channel state information for the DLCC having mapped thereto a same carrier indicator as that of the ULCC indicated by the CIF from the base station apparatus 101, and reports the channel state information, using a part or all of the assigned uplink transmission resources. For example, the mobile station apparatus 102 maps the generated channel state information to the PUSCH resource in the ULCC-1 assigned by the base station apparatus 101, and reports it to the base station apparatus 101 (step S1302).

Furthermore, another example will be described. The following describes an example in which the base station apparatus 101 specifies a DLCC for generating the channel state information for the mobile station apparatus 102, when the base station apparatus 101 communicates with the mobile station apparatus 102 using three DLCCs (e.g., DLCC-0, DLCC-1, and DLCC-2) and three ULCCs (e.g., ULCC-0, ULCC-1, and ULCC-2).

Here, as an example, the carrier indicator 000 is mapped to the DLCC-0, the carrier indicator 010 is mapped to the DLCC-1, and the carrier indicator 111 is mapped to the DLCC-2 by the base station apparatus 101. In addition, the carrier indicator 000 is mapped to the ULCC-0, the the carrier indicator 010 is mapped to the ULCC-1, and the carrier indicator 111 is mapped to the ULCC-2 by the base station apparatus 101. As described above, a DLCC and a ULCC having a same carrier indicator (a same value of a carrier indicator) are associated with each other. In other words, a DLCC and a ULCC having mapped thereto a same carrier indicator are associated with each other.

Here, the base station apparatus 101 can link a DLCC and a ULCC in a Cell-specific or UE-specific manner. For example, the base station apparatus 101 can provide a linking between the DLCC-1 and the ULCC-0, and between the DLCC-1 and the ULCC-1. In addition, the base station apparatus 101 assigns the uplink transmission resource to the mobile station apparatus 102. For example, the base station apparatus 101 transmits, via the DLCC-1, the DCI Format0 including the RB assignment information for the PUSCH, and assigns the PUSCH resource to the mobile station apparatus 102.

The base station apparatus 101 sets the value of the CIF included in the DCI Format0 to the value of the carrier indicator mapped to one of the ULCCs which have been linked to the DLCCs, and notifies it to the mobile station apparatus 102. For example, the base station apparatus 101 sets the value of the CIF included in the DCI Format0 to the value of the carrier indicator mapped to the ULCC-1 linked to the DLCC-1, or mapped to the ULCC-0 linked to the DLCC-1 and notifies it to the mobile station apparatus 102.

In other words, the base station apparatus 101 sets the value of the CIF included in the DCI Format0 to 000 (carrier indicator mapped to ULCC-0) or 010 (carrier indicator mapped to ULCC-1), and notifies it to the mobile station apparatus 102. To put it another way, the base station apparatus 101 does not set the value of the CIF included in the DCI Format0 to 111 (carrier indicator mapped to ULCC-1).

The mobile station apparatus 102 generates the channel state information for the DLCC having mapped thereto a same carrier indicator as that of the ULCC indicated by the CIF from the base station apparatus 101, and reports the generated channel state information. In other words, if the value of the CIF included in the DCI Format0 from the base station apparatus 101 is set to 000, the mobile station apparatus 102 generates the channel state information for the DLCC-0 and reports the generated channel state information. In addition, if the value of the CIF included in the DCI Format0 from the base station apparatus 101 is set to 010, the mobile station apparatus 102 generates the channel state information for the DLCC-1 and reports the generated channel state information to the base station apparatus 101.

Here, the mobile station apparatus 102 maps the channel state information to the uplink transmission resource (e.g., the PUSCH resource), based on the uplink transmission resource (e.g., RB assignment information to PUSCH) included in the DCI Format0 from the base station apparatus 101, and transmits it to the base station apparatus 101.

In other words, the base station apparatus 101 can provide a linking between the DLCC and the ULCC in a Cell-specific or UE-specific manner. Furthermore, the base station apparatus 101 can set the value of the CIF included in the DCI Format0 to the value of the carrier indicator mapped to one of the ULCCs which are linked to the DLCC, and notify it to the mobile station apparatus 102. In addition, the mobile station apparatus 102 can generate the channel state information for the DLCC having mapped thereto a same carrier indicator as that of the ULCC indicated by the CIF from the base station apparatus 101, and report the generated channel state information.

As thus described, the base station apparatus 101 may specify, for the mobile station apparatus 102, a DLCC for generating the channel state information, and whereby the base station apparatus 101 can specify a DLCC for generating the channel state information with a higher precision. For example, upon detecting a value of the CIF included in the DCI Format0 from the base station apparatus 101 as a value indicating a ULCC which is not (preliminarily) linked (if, for example, a value of the CIF is detected as 111 (carrier indicator mapped to the ULCC-2)), the mobile station apparatus 102 can avoid transmission of the channel state information unintended by the base station apparatus 101 by not transmitting the channel state information.

As shown in the foregoing, using the CIF included in the downlink control information format by which assigning the uplink transmission resource, the base station apparatus 101 may implicitly instruct for which DLCC the mobile station apparatus 102 is supposed to transmit the channel state information, and whereby it is possible to flexibly specify, in a system where two or more bands (e.g., component carriers) can be configured which are measuring (generating) targets of the channel state information.

In addition, the mobile station apparatus 102 may generate the channel state information for the DLCC having mapped thereto a same carrier indicator as that of the ULCC that is indicated in CIF from the base station apparatus 101, and whereby the base station apparatus 101 can flexibly specify a DLCC for generating the channel state information for the mobile station apparatus 102. Furthermore, it is not necessary to explicitly indicate a DLCC to generate the channel state information by the base station apparatus 101 (preparation of a bit field for indicating a DLCC is not required), and whereby it is possible to specify, for the mobile station apparatus 102, a DLCC for effectively generating the channel state information.

Although the foregoing description has explained a method of generating, by the mobile station apparatus 102, the channel state information for a DLCC having mapped thereto a same carrier indicator as that of the ULCC specified in the CIF from the base station apparatus 101, the method is not limited thereto. For example, a predetermined parameter (e.g., an offset) may be set by the base station apparatus 101, and the mobile station apparatus 102 may identify (determine) a DLCC for generating the channel state information, based on the CIF from the base station apparatus 101 and a predetermined parameter.

Fifth Embodiment

Next, a fifth embodiment of the present invention will be described. In the first embodiment of the present invention, description has been provided such that the base station apparatus 101 transmits the DCI Format0 including a bit field for indicating whether or not reporting of the channel state information is requested, together with a bit field (information) included therein, instructing for which DLCC the mobile station apparatus 102 is supposed to generate (measure) the channel state information, and the mobile station apparatus 102 generates the channel state information for the DLCC instructed by the base station apparatus 101 and reports the generated channel state information.

In the fifth embodiment of the present invention, description is provided in which the base station apparatus 101 (re)uses the information included in the downlink control information format to instruct for which DLCC the mobile station apparatus 102 is supposed to generate the channel state information. In other words, the base station apparatus 101 can (re)use an existing bit field (a predetermined bit field) to instruct for which DLCC the mobile station apparatus 102 is supposed to generate the channel state information. For example, the base station apparatus 101 can specify a DLCC for the mobile station apparatus 102 to generate the channel state information by setting the RB assignment field, and/or, the MCS field, and/or, the CQI request field included in the DCI Format0 to a specific value (setting a predetermined first field(s) to a predetermined value) and further, in this occasion, (re)using a New Data Indicator field (a predetermined second field) as a field for specifying a DLCC.

In other words, if the RB assignment field, and/or, the MCS field, and/or, the CQI request field (a predetermined first field(s)) included in the DCI Format0 are set to a value other than a specific value (a predetermined value), to a certain field (a predetermined second field) information indicating initial transmission or re-transmission is set (used as a New Data Indicator field). In addition, if the RB assignment field, and/or, the MCS field, and/or, the CQI request field included in the DCI Format0 (a predetermined first field(s)) are set to a specific value (a predetermined value), to a certain field (a predetermined second field) information specifying a DLCC for the mobile station apparatus 102 to generate the channel state information by is set.

In other words, the mobile station apparatus 102 changes the interpretation of the information which is set in a certain field, depending on whether the RB assignment field, and/or, the MCS field, and/or, the CQI request field included in the DCI Format0 are set to a value other than a specific value, or set to a specific value. In other words, the mobile station apparatus 102 can change the interpretation of the information which is set in a certain field to information indicating initial transmission or re-transmission, or information specifying a DLCC for generating the channel state information.

Figure 14:
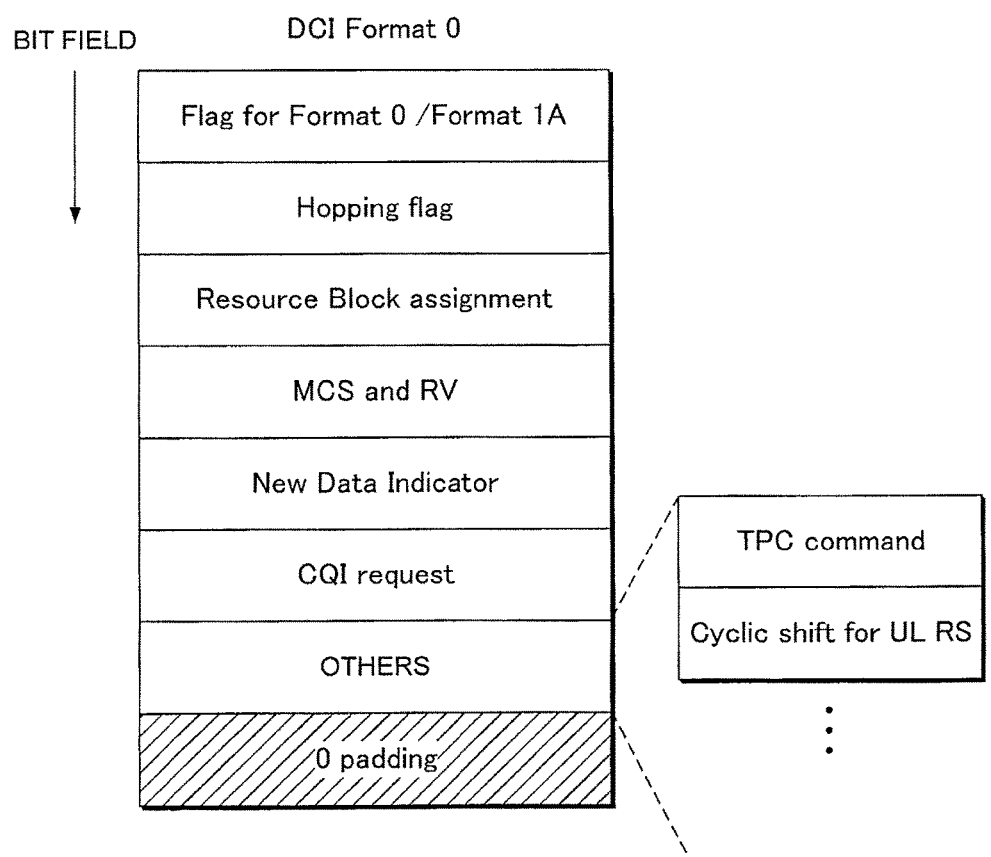
FIG. 14 illustrates another exemplary configuration of downlink control information format according to an embodiment of the present invention.

A radio communication system according to the fifth embodiment can be implemented by a configuration similar to that of the radio communication system shown in FIG. 1. FIG. 14 illustrates an exemplary configuration of the DCI Format0 according to the fifth embodiment.

As shown in FIG. 14, the DCI Format0, including uplink-related information such as uplink scheduling information, includes (is formed by) a flag (Flag for Format0/Format1A) for distinguishing between the DCI Format0 and a Format1A which is another downlink control information format, a bit field indicating uplink scheduling such as a Hopping flag, RB assignment information (Resource block assignment) or the like; an MCS (Modulation and Coding Scheme) and RV (Redundancy Version) bit field indicating modulation scheme and coding rate, parameters for retransmission or the like; a New Data Indicator bit field indicating whether the transmission is initial transmission or re-transmission; a CQI request bit field indicating whether or not reporting of the channel state information (channel quality indicator) is requested; a TPC (Transmission Power Control) command bit indicating uplink transmit power; a Cyclic shift for ULRS bit field indicating a resource of an uplink reference signal, or the like.

For example, when instructing, by uplink scheduling information, the mobile station apparatus 102 to transmit only the control information such as the channel state information, the base station apparatus 101 sets a certain field as information indicating a DLCC for generating the channel state information. For example, the base station apparatus 101 instructs the mobile station apparatus 102 to transmit only the control information by assigning the number of fields for the RB assignment information included in the DCI Format0 to be equal to or smaller than a predetermined number of RBs (e.g., setting the number of RB assignment fields equal to or smaller than 4 RBs) and setting the field for MCS and RV to a predetermined value (e.g., setting the MCS and RV field to 29), and setting the CQI request field to "1".

In this occasion, the base station apparatus 101 further sets, in the New Data Indicator field included in the DCI Format0, information instructing for which DLCC the mobile station apparatus 102 is supposed to generate the channel state information, and notifies it to the mobile station apparatus 102. In other words, in this occasion, interpretation of the New Data Indicator field is changed to a field instructing for which DLCC the mobile station apparatus 102 is supposed to generate the channel state information.

Here, it is predetermined by specifications or the like and supposed to have preliminarily been shared between the base station apparatus 101 and the mobile station apparatus 102 the recognition of which field the interpretation thereof is supposed to be changed when any field included in the DCI Format0 is set to any value.

The mobile station apparatus 102 checks a predetermined field in order to detect the DCI Format0 addressed to its own apparatus and determine interpretation of a certain field. For example, the mobile station apparatus 102 first checks the field for RB assignment information, the field for MCS and RV, and the CQI request field, in order to determine whether a certain field should be interpreted as a New Data Indicator field, or as a field instructing which DLCC the channel state information is supposed to be generated for.

The mobile station apparatus 102 checks a predetermined field and, if it is necessary to transmit the channel state information for the DLCC instructed by the base station apparatus 101, transmits the PUSCH in one of ULCCs, referring to information related to an uplink assignment included in the DCI Format0 (hopping flag, RB assignment information (e.g., RB assignment information for a PUSCH, RB assignment information for a PUCCH), CIF if CIF is included).

If, in this occasion, transmission of only the control information is instructed from the base station apparatus 101, the mobile station apparatus 102 maps only the control information to the PUSCH resource and transmits it. For example, the mobile station apparatus 102 generates the channel state information for the DLCC instructed by the base station apparatus 101, maps only the generated channel state information to the PUSCH resource and transmits it. In addition, for example, the mobile station apparatus 102 generates the channel state information for the DLCC instructed by the base station apparatus 101 and, if it is necessary to transmit information indicating an ACK or NACK (ACK/NACK signal, affirmative acknowledge or negative acknowledge) for the downlink data when reporting the generated channel state information, maps the channel state information and the information indicating the ACK or NACK to the PUSCH resource, and transmits it to the base station apparatus 101.

Here, the base station apparatus 101 may set, directly in a certain field, information instructing for which DLCC the mobile station apparatus 102 is supposed to generate the channel state information. Alternatively, the base station apparatus 101 may set, indirectly in a certain field, information instructing for which DLCC the mobile station apparatus 102 is supposed to generate channel state information.

For example, if a value set in a certain field is "1", the base station apparatus 101 and the mobile station apparatus 102 generate the channel state information for the DLCC-0 and, if a value set in a certain field is "0", they can preliminarily share the recognition of generating the channel state information for the DLCC-1 and the DLCC-2. In addition, if, for example, a value set in a certain field is "0", the base station apparatus 101 and the mobile station apparatus 102 can preliminarily share the recognition of generating the channel state information for all the DLCCs (the channel state information for the DLCC-0, the DLCC-1, and the DLCC-2). In other words, correspondence between value set in a certain field and a DLCC for which the mobile station apparatus 102 generates the channel state information can be predetermined.

In other words, if a predetermined value is set in a certain field by the base station apparatus 101, the mobile station apparatus 102 can also report the channel state information for a plurality of DLCCs. For example, if "0" is set in a certain field by the base station apparatus 101, the mobile station apparatus 102 may generate the channel state information for the DLCC activated by the base station apparatus 101, and report the generated channel state information.

For example, as described above, if it has been determined to change the interpretation of the New Data Indicator field to a field indicating a DLCC for generating the channel state information, by setting the field for RB assignment information, and/or, the field for MCS and RV, and/or, the CQI request field to a specific value by the base station apparatus 101, the base station apparatus 101 can instruct the mobile station apparatus 102 to generate the channel state information for the activated DLCC, by setting "1" as the value of a field indicating the DLCC for generating the channel state information (to put it another way, New Data Indicator field).

Here, the base station apparatus 101 can activate or deactivate the DLCC(s) for the mobile station apparatus 102. For example, the base station apparatus 101 activates a DLCC which is used to transmit the downlink signal (e.g., the PDCCH and/or the PDSCH) to the mobile station apparatus 102. On the other hand, the base station apparatus 101 deactivates a DLCC which is not used to transmit the downlink signal (e.g., the PDSCH and/or the PDSCH) to the mobile station apparatus 102. The mobile station apparatus 102 attempts to detect the downlink signal on the activated DLCC. On the other hand, the mobile station apparatus 102 does not attempt to detect the downlink signal on the deactivated DLCC.

In other words, upon detecting the DCI Format0 and, if a specific field has been set to a specific value, the mobile station apparatus 102 generates the channel state information for the activated DLCC(s), and reports the generated channel state information. Here, upon detecting the DCI Format0 and, if a specific field has been set by to a specific value, the mobile station apparatus 102 may transmit information indicating that the DLCC has been deactivated (may transmit it as information for checking that the DLCC has been deactivated) by reporting the channel state information for the deactivated DLCC(s) as a specific cord word (e.g., reporting channel state information set to 0000).

Here, when instructed to generate the channel state information for the DLCC which has been deactivated by the base station apparatus 101, the mobile station apparatus 102 may ignore the instruction. For example, when instructed to generate the channel state information for the DLCC which has been deactivated by the DCI Format0 from the base station apparatus 101, the mobile station apparatus 102 may ignore the instruction.

In addition, when instructed to generate the channel state information for the DLCC which has been deactivated by the base station apparatus 101, the mobile station apparatus 102 may activate the DLCC to generate the channel state information, and report the generated channel state information. For example, when instructed to generate the channel state information for the DLCC which has been deactivated by the DCI Format0 from the base station apparatus 101, the mobile station apparatus 102 may activate the DLCC to generate the channel state information, and report the generated channel state information.

Here, although the foregoing description has explained a method of reusing the New Data Indicator field (changing the interpretation of the New Data Indicator field to an information field indicating a DLCC for generating the channel state information) by the base station apparatus 101 and the mobile station apparatus 102, the method is not limited thereto.

For example, if a specific field has been set to a specific value, the base station apparatus 101 and the mobile station apparatus 102 may change the interpretation of the TPC command field or the Cyclic shift for ULRS field to an information field indicating a DLCC for generating the channel state information. In addition, a plurality of fields which are combinations of the New Data Indicator field, the TPC command field, and the Cyclic shift for ULRS field may be interpreted as an information field indicating a DLCC for generating the channel state information.

As has been shown in the foregoing, the base station apparatus 101 may (re)use a field included in the downlink control information format to instruct which DLCC the mobile station apparatus 102 is supposed to generate the channel state information for, whereby it is possible to flexibly specify, in a system having two or more bands (e.g., component carriers) that can be configured for measuring (generating) the channel state information.

In addition, the mobile station apparatus 102 may change the interpretation of the field included in the downlink control information format from the base station apparatus 101 and generate the channel state information for a DLCC, according to a value set in the changed field, whereby the base station apparatus 101 can flexibly specify the DLCC for which the mobile station apparatus 102 is supposed to generate the channel state information. Furthermore, it is not necessary to explicitly indicate a DLCC for generating the channel state information by the base station apparatus 101 (preparation of a bit field for indicating a DLCC is not required), whereby it is possible to specify, for the mobile station apparatus 102, a DLCC for effectively generating the channel state information.

Furthermore, the mobile station apparatus 102 may change the interpretation of the field included in the downlink control information format from the base station apparatus 101 and generate the channel state information for plurality of DLCCs, according to a value set in the changed field, whereby the base station apparatus 101 can flexibly specify a plurality of DLCCs for which the mobile station apparatus 102 is supposed to generate the channel state information. Furthermore, it is not necessary to explicitly indicate a plurality of DLCCs for generating the channel state information by the base station apparatus 101 (preparation of a bit field for indicating a plurality of DLCCs is not required), whereby it is possible to specify, for the mobile station apparatus 102, a plurality of DLCCs for effectively generating the channel state information.

Although a case has been explained, in each of the embodiments described above, where the base station apparatus 101 includes the CIF in the downlink control information format to be transmitted to the mobile station apparatus 102, the base station apparatus 101 and the mobile station apparatus 102 can preliminarily share the recognition that the downlink control information format does not include the CIF field when transmitting on the Cell-specific SS (CSS). In addition, the base station apparatus 101 and the mobile station apparatus 102 can preliminarily share the recognition that the downlink control information format include the CIF field when transmitting on the UE-specific SS (USS).

In other words, the base station apparatus 101 can allocate the downlink control information format not including the CIF on the Cell-specific SS and transmit it to the mobile station apparatus 102. Alternatively, the base station apparatus 101 can allocate the downlink control information format including the CIF on the UE-specific SS and transmit it to the mobile station apparatus 102.

FIG. 15 illustrates whether or not the CIF is included in the downlink control information format, when the base station apparatus 101 allocates the downlink control information format on the Cell-specific SS or the UE-specific SS. The base station apparatus 101 and the mobile station apparatus 102 can preliminarily share the relation between the search space such as that shown in FIG. 15 and the CIF included in the downlink control information format.

As shown in FIG. 15, for example, the base station apparatus 101 transmits, to the mobile station apparatus 102, the downlink control information format to be allocated on the Cell-specific SS without including the CIF therein (non-existent). Alternatively, for example, the base station apparatus 101 transmits, to the mobile station apparatus 102, the downlink control information format to be allocated on UE-specific SS without including the CIF (non-existent) or including the CIF (existent). As thus described, the base station apparatus 101 may limit the downlink control information format including the CIF or not including the CIF, according to the search space to be allocated, whereby it becomes possible to decode the downlink control information format (may also be downlink control information) allocated on the Cell-specific SS, even if the mobile station apparatus 102 does not support the downlink control information format including the CIF.

Sixth Embodiment

In the sixth embodiment of the present invention, a block configuration of the base station apparatus 101, a block configuration of the mobile station apparatus 102, and the function of respective blocks will be described.

Figure 16:
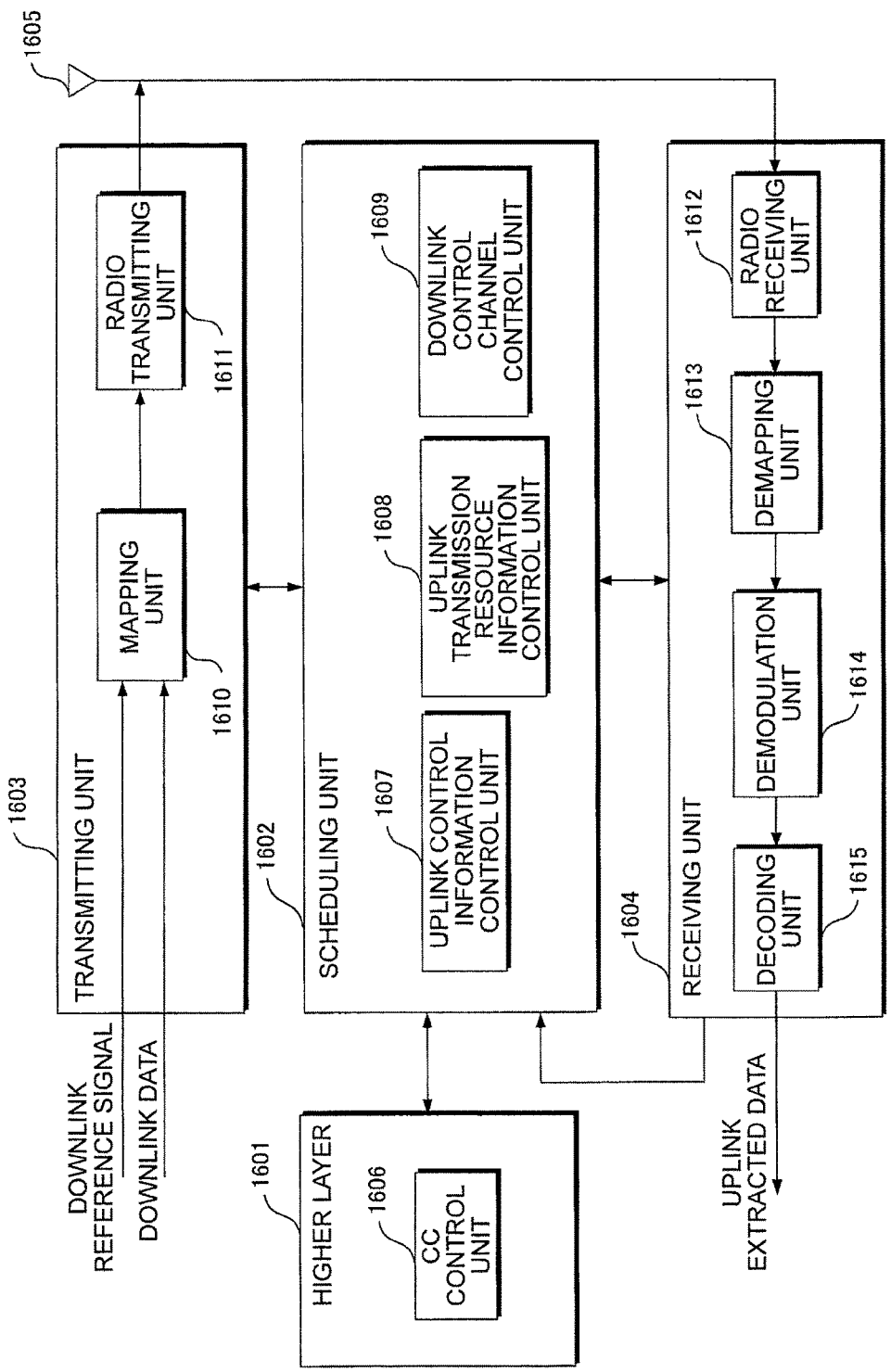
FIG. 16 illustrates an exemplary block configuration of a base station apparatus 101 according to an embodiment of the present invention.

FIG. 16 illustrates an exemplary block configuration of the base station apparatus 101 according to the present embodiment. The base station apparatus 101 has a higher layer 1601, a scheduling unit 1602, a transmitting unit (downlink transmitting unit, base station transmitting unit) 1603, a receiving unit (uplink receiving unit, base station receiving unit) 1604, and an antenna unit (base station antenna unit) 1605. The higher layer 1601 has a CC control unit 1606. The scheduling unit 1602 has an uplink control information control unit 1607, a downlink transmission resource information control unit 1608, and a downlink control channel control unit 1609. The transmitting unit 1603 has a mapping unit (downlink mapping unit) 1610, and a radio transmitting unit (downlink radio transmitting unit) 1611. The receiving unit 1604 has a radio receiving unit (uplink radio receiving unit) 1612, a demapping unit (uplink demapping unit) 1613, a demodulation unit 1614, and a decoding unit 1615.

The CC control unit 1606 of the higher layer 1601 manages the DLCC and the ULCC supported by the base station apparatus 101, and controls the DLCC and the ULCC used for communication with the mobile station apparatus 102. Based on information acquired from the higher layer 1601, the scheduling unit 1602 determines whether or not to cause each mobile station apparatus 102 to report the channel state information, and determines an uplink transmission resource to be assigned to each mobile station apparatus 102. In addition, the scheduling unit 1602 generates downlink control information for notifying the mobile station apparatus 102 of the determined uplink transmission resource. Furthermore, when retrieving data from a reception signal which has been received from the mobile station apparatus 102, the scheduling unit 1602 controls separation of the reception signal, based on the determined uplink transmission resource.

The uplink control information control unit 1607 in the scheduling unit 1602 determines whether or not to cause each mobile station apparatus 102 to report the channel state information, and which DLCC the channel state information is supposed to be reported for. The uplink transmission resource information control unit 1608 determines an uplink transmission resource to be assigned to each mobile station apparatus 102, and store the determined uplink transmission resource.

Here, when determining an uplink transmission resource to be assigned to each mobile station apparatus 102, an effect such as that described in the third embodiment can be obtained by determining which ULCC the uplink transmission resource is supposed to be assigned for, based on whether or not to cause each mobile station apparatus 102 determined by the uplink control information control unit 1607 to report the channel state information, and based on which DLCC the channel state information is supposed to be reported for.

The downlink control channel control unit 1609 generates downlink control information to be notified to the mobile station apparatus 102, and determines a downlink transmission resource for transmitting a physical downlink control channel to which the generated downlink control information is supposed to be mapped.

Here, when determining an uplink transmission resource to be notified to each mobile station apparatus 102, an effect such as that described in the first, the fourth, or the fifth embodiment can be obtained by generating downlink control information explicitly or implicitly specifying which DLCC the channel state information is supposed to be reported for, based on whether or not to cause each mobile station apparatus 102 determined by the uplink control information control unit 1607 to report the channel state information, and based on which DLCC the channel state information is supposed to be reported for.

In addition, when determining a downlink transmission resource for transmitting a physical downlink control channel to which the generated downlink control information is supposed to be mapped, an effect such as that described in the second or the fourth embodiment can be obtained by determining which DLCC the transmission resource is supposed to be used for, based on whether or not to cause each mobile station apparatus 102 determined by the uplink control information control unit 1607 to report the channel state information, and based on which DLCC the channel state information is supposed to be reported for.

The transmitting unit 1603 generates and transmits a downlink transmission signal. The mapping unit 1610 in the transmitting unit 1603 maps the downlink control information generated by the scheduling unit 1602 to a transmission resource in the physical downlink control channel determined by the scheduling unit 1602, and maps the downlink data and the downlink reference signal to a predetermined transmission resource. The radio transmitting unit 1611 converts a digital signal including the mapped downlink control information into an analog signal, and up-converts it into a radio frequency band to generate a radio transmission signal, and transmits it via the antenna unit 1605.

The receiving unit 1604 receives the uplink reception signal, and extracts uplink data. The radio receiving unit 1612 in receiving unit 1604 down-converts the reception signal which has been received via the antenna unit 1605, and converts analog signals into digital signals. The demapping unit 1613 demaps the reception data in the uplink transmission resource determined by the scheduling unit 1602. Here, the demapping unit 1613 extracts channel state information from a signal allocated in the uplink transmission resource stored in the uplink transmission resource information control unit 1608. The demodulation unit 1614 performs a demodulation process corresponding to the process in a modulation unit 1714 in the mobile station apparatus 102. The decoding unit 1615 performs an error correction decoding process corresponding to the process in a coding unit 1713 in the mobile station apparatus 102.

Figure 17:
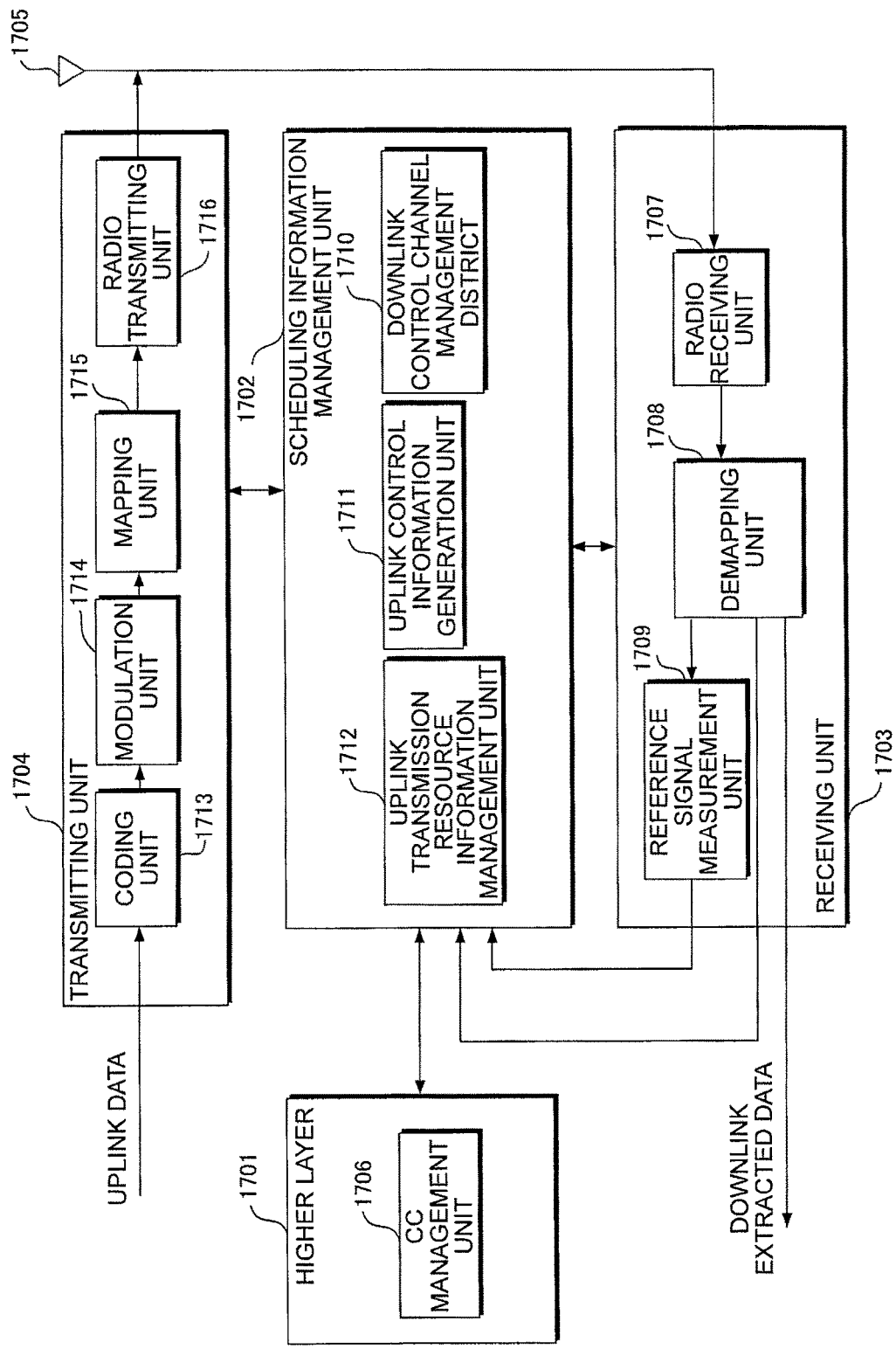
FIG. 17 illustrates an exemplary block configuration of a mobile station apparatus 102 according to an embodiment of the present invention.
Figure 18:
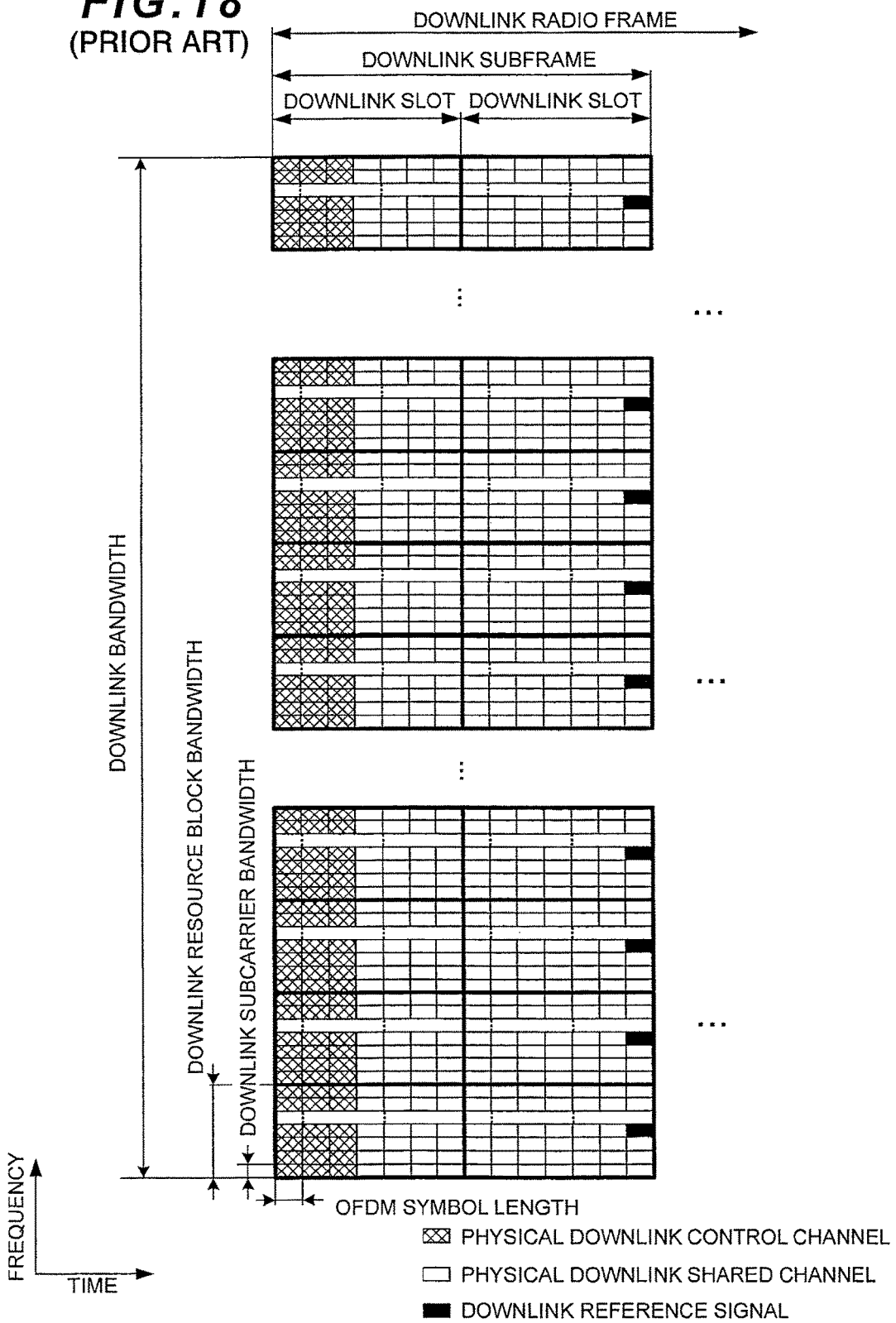
FIG. 18 illustrates an exemplary structure of a downlink radio frame in prior art.
Figure 19:
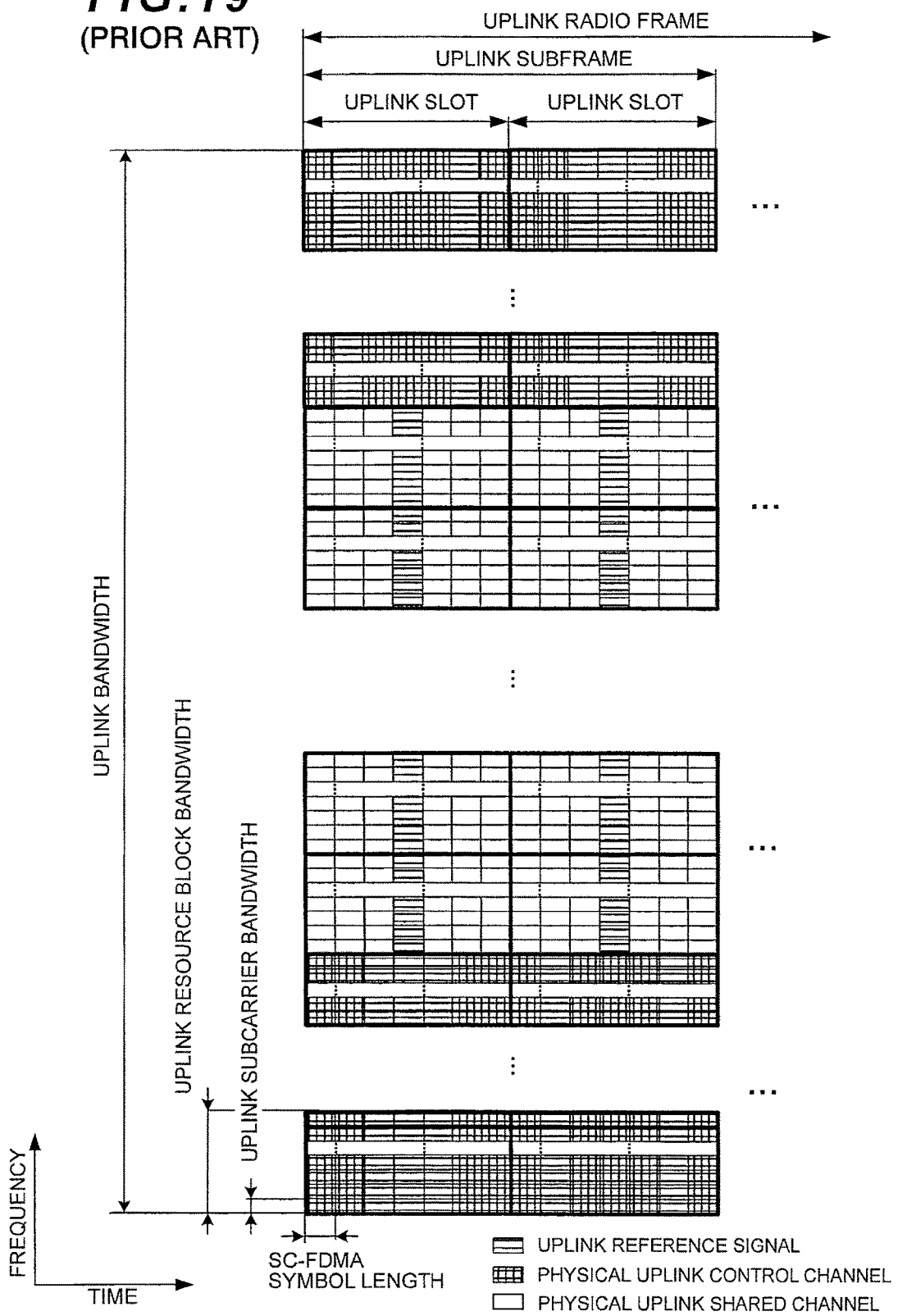
FIG. 19 illustrates an exemplary structure of an uplink radio frame in prior art.
Figure 20:
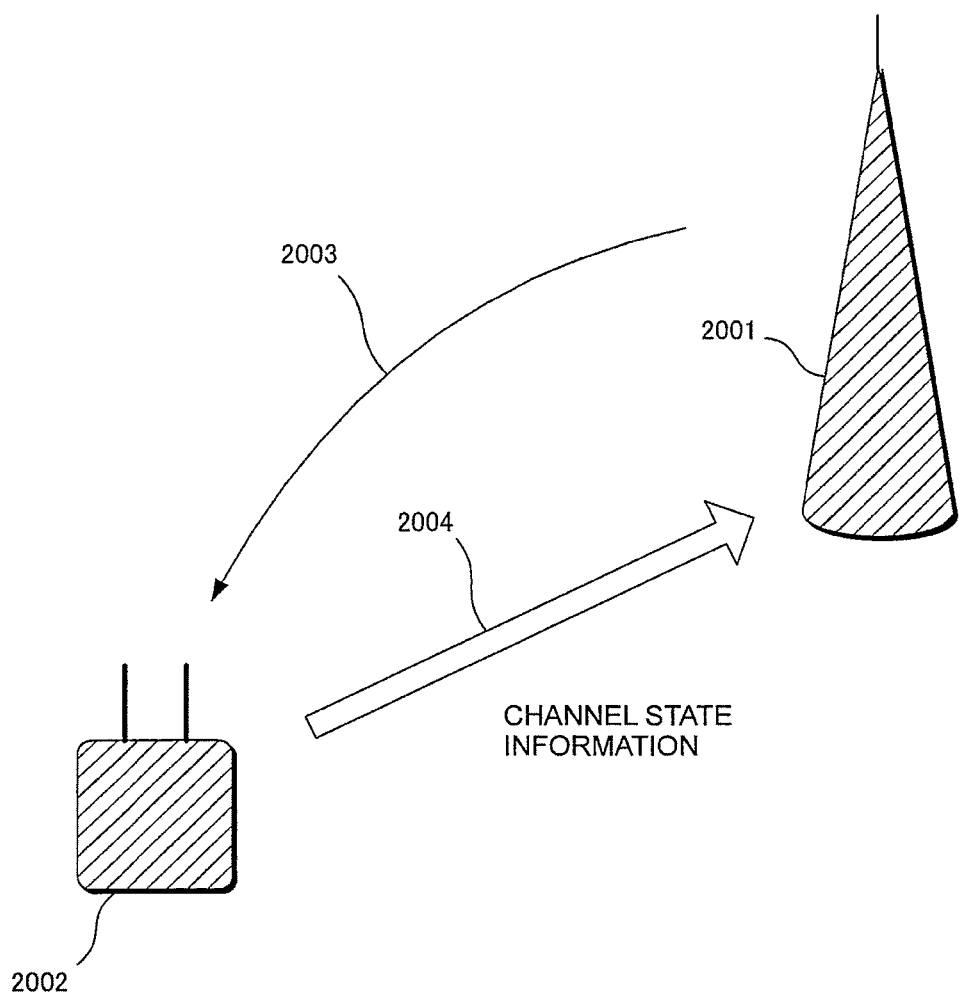
FIG. 20 illustrates an exemplary report of channel state information in prior art.
Figure 21:
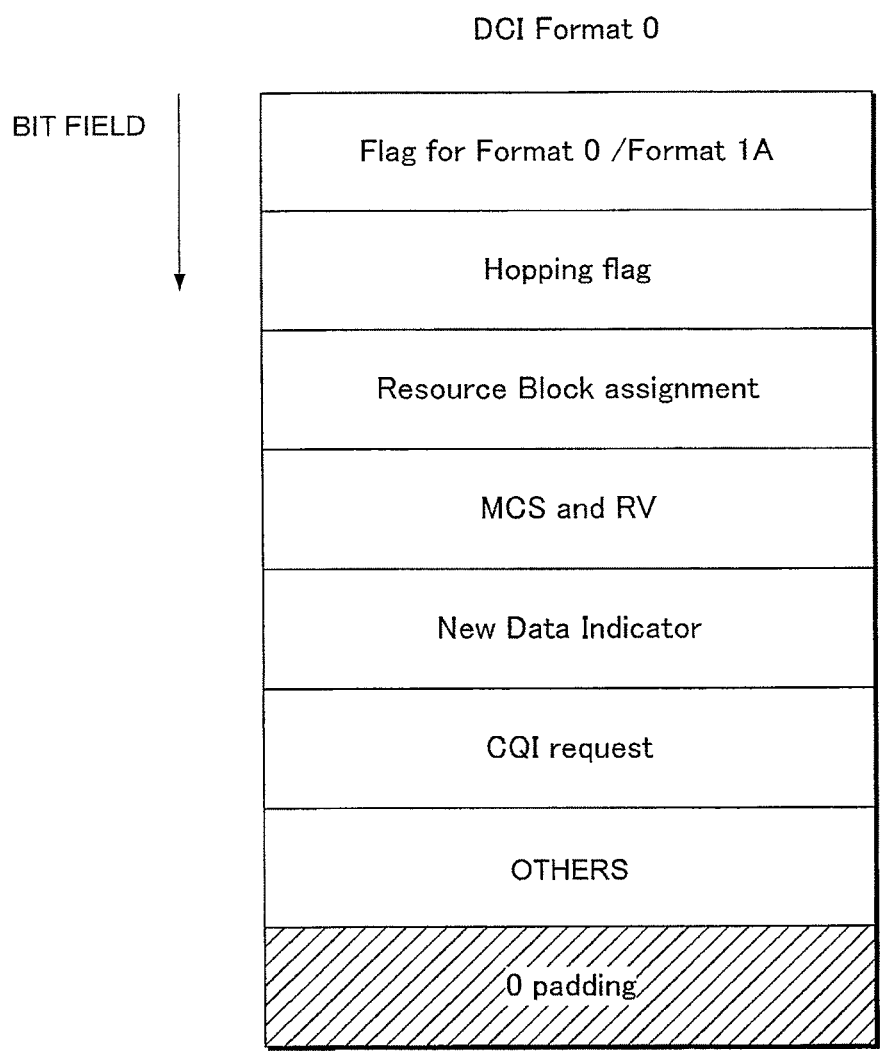
FIG. 21 illustrates an exemplary configuration of downlink control information format in prior art.

FIG. 17 illustrates an exemplary block configuration of the mobile station apparatus 102 according to the present embodiment. The mobile station apparatus 102 has a higher layer 1701, a scheduling information management unit 1702, a receiving unit (downlink receiving unit, mobile station receiving unit) 1703, a transmitting unit (uplink transmitting unit, mobile station transmitting unit) 1704, and an antenna unit (mobile station antenna unit) 1705. The higher layer 1701 has a CC management unit 1706. The scheduling information management unit 1702 has a downlink control channel management unit 1710, an uplink control information unit 1711, and an uplink transmission resource information management region 1712. The receiving unit 1703 has a radio receiving unit (downlink radio receiving unit) 1707, a demapping unit (downlink demapping unit) 1708, and a reference signal measurement unit 1709. The transmitting unit 1704 has a coding unit 1713, a modulation unit 1714, a mapping unit (uplink mapping unit) 1715, and a radio transmitting unit (an uplink radio transmitting unit) 1716.

The CC management unit 1706 in the higher layer 1701 performs management of the DLCC and the ULCC supported by the base station apparatus 101, and management of the DLCC and the ULCC used for communication with the mobile station apparatus 102. The information set in CC management unit 1706 by the CC control unit 1606 via signaling in the higher layer 1701.

The scheduling information management unit 1702 controls searching (monitoring) of downlink control information notified from the base station apparatus 101, based on the information acquired from the higher layer 1701, and decodes the reception data acquired from search space. In addition, upon detecting downlink control information addressed to its own apparatus from the decoded reception data, the scheduling information management unit 1702 extracts and stores an uplink transmission resource addressed to its own apparatus from the downlink control information. Furthermore, when reporting the channel state information, the scheduling information management unit 1702 determines which DLCC the channel state information is supposed to be generated (reported) for, and, if necessary, instructs the demapping unit 1708 to extract a reference signal allocated in the DLCC for which the channel state information is supposed to be generated (reported) for.

The downlink control channel management unit 1710 in the scheduling information management unit 1702 sets (calculates) a DLCC and/or a search space in which a physical downlink control channel is supposed to be searched. In addition, using a CRC and/or an RNTI added to the downlink control information in the DLCC and/or the search space which has been set, the downlink control channel management unit 1710 determines whether the downlink control information is addressed to its own apparatus. Furthermore, the downlink control channel management unit 1710 determines the type or the like of the downlink control information format, and determines the usage of the downlink control information.

Here, when downlink control information addressed to its own apparatus is detected and reporting of channel state information is instructed, an effect similar to that described in the second embodiment can be obtained by determining which DLCC the channel state information is supposed to be generated (reported) for, based on the DLCC and/or the search space set by the downlink control channel management unit 1710.

In addition, when downlink control information addressed to its own apparatus is detected and reporting of channel state information is instructed, an effect similar to that described in the first, the fourth, or the fifth embodiment can be obtained by determining which DLCC the channel state information is supposed to be generated (reported) for, based on the bit sequence indicated in the bit field of the downlink control information.

In addition, when downlink control information addressed to its own apparatus is detected and reporting of channel state information is instructed, an effect similar to that described in the third or the fourth embodiment can be obtained by determining generation (reporting) of channel state information for the DLCC corresponding to the ULCC indicated in the bit field of the downlink control information.

When instructed to report the channel state information by downlink control information addressed to its own apparatus, the uplink control information unit 1711 generates uplink control information including the channel state information, based on a the measurement result output from the reference signal measurement unit 1709.

If the downlink control information is addressed to its own apparatus, the uplink transmission resource information management unit 1712 extracts and stores an uplink transmission resource (ULCC, if necessary), using the format of the downlink control information and the scheduling information included in the downlink control information. Here the ULCC to be extracted may be explicitly specified by the downlink control information, or may be preliminarily set by signaling or the like in the higher layer 1701.

The receiving unit 1703 receives the downlink reception signal and extracts the downlink control information, the reference signal measurement result, and the uplink extraction data. The radio receiving unit 1707 in the receiving unit 1703 has a function of down-converting the reception signal received via the antenna unit 1705 and converting analog signals into digital signals. The demapping unit 1708 demaps the reception data in the DLCC and/or the search space set by the scheduling information management unit 1702, and also demaps the reference signal of the DLCC set by the scheduling information management unit 1702. In addition, the demapping unit 1708 extracts downlink extraction data. The reference signal measurement unit 1709 measures the reference signal demapped by the demapping unit 1708.

The transmitting unit 1704 generates and transmits an uplink transmission signal. The coding unit 1713 in the transmitting unit 1704 performs an error correcting coding process on the uplink data. The modulation unit 1714 performs digital modulation of the error-correction-coded uplink data and generates a modulated symbol sequence. The mapping unit 1715 maps the modulated symbol sequence and the uplink control information to the uplink transmission resource extracted by the scheduling information management unit 1702. The radio transmitting unit 1716 converts a digital signal including the mapped modulated symbol to an analog signal, up-converts it into a radio frequency band to generate a radio transmission signal, and transmits it via the antenna unit 1705.

As has been shown in the foregoing, the base station apparatus 101 may instruct which component carrier the mobile station apparatus 102 is supposed to generate the channel state information for, whereby it is possible to flexibly specify, in a system having two or more bands (e.g., component carriers) that can be configured for measuring (generating) the channel state information.

(a) In order to achieve the above-mentioned object, the present invention has taken the following measures. That is, a mobile communication system in which a base station apparatus and a mobile station apparatus communicate with each other using a plurality of component carriers configured by a base station apparatus is characterized in that the base station apparatus notifies the mobile station apparatus of downlink control information indicating for which one of a plurality of downlink component carriers the channel state information is supposed to be generated, and the mobile station apparatus generates channel state information for a downlink component carrier, according to the downlink control information.

(b) In addition, the mobile communication system in which a base station apparatus and a mobile station apparatus communicate with each other using a plurality of component carriers configured by a base station apparatus, is characterized in that the base station apparatus allocates downlink control information in one of a plurality of downlink component carriers, and the mobile station apparatus generates channel state information for a downlink component carrier, according to the downlink component carrier in which the downlink control information has been detected.

(c) In addition, the mobile communication system in which a base station apparatus and a mobile station apparatus communicate with each other using a plurality of component carriers configured by a base station apparatus, is characterized in that the base station apparatus allocates downlink control information in one of a plurality of search spaces, and the mobile station apparatus generates channel state information for a downlink component carrier, according to the search space in which the downlink control information has been detected.

(d) In addition, the mobile communication system in which a base station apparatus and a mobile station apparatus communicate with each other using a plurality of component carriers configured by a base station apparatus, is characterized in that the base station apparatus notifies the mobile station apparatus of downlink control information by which an uplink transmission resource is assigned, and the mobile station apparatus generates channel state information for a downlink component carrier, according to the downlink control information.

(e) In addition, the mobile communication system in which a base station apparatus and a mobile station apparatus communicate with each other using a plurality of component carriers configured by a base station apparatus, is characterized in that the base station apparatus notifies the mobile station apparatus of downlink control information indicating an uplink component carrier in which the uplink transmission resource assigned to the mobile station apparatus is supposed to be allocated, and the mobile station apparatus generates channel state information for a downlink component carrier, according to the downlink control information.

(f) In addition, the mobile communication system in which a base station apparatus and a mobile station apparatus communicate with each other using a plurality of component carriers configured by a base station apparatus, is characterized in that the base station apparatus notifies the mobile station apparatus of downlink control information with a predetermined first field thereof set to a predetermined value, and the mobile station apparatus changes the interpretation for a predetermined second field, according to the predetermined value which has been set to the predetermined first field of the downlink control information, and generates channel state information for a downlink component carrier.

(g) In addition, the mobile communication system in which a base station apparatus and a mobile station apparatus communicate with each other using a plurality of component carriers configured by a base station apparatus, is characterized in that the base station apparatus notifies the mobile station apparatus of downlink control information with a predetermined first field thereof set to a predetermined value, and the mobile station apparatus changes the interpretation for a predetermined second field, according to the predetermined value which has been set to the predetermined first field of the downlink control information, and generates channel state information for a downlink component carrier.

(h) In addition, the base station apparatus in the mobile communication system in which a base station apparatus and a mobile station apparatus communicate with each other using a plurality of component carriers configured by a base station apparatus is characterized in having a notifier which notifies the mobile station apparatus of downlink control information indicating which one of a plurality of downlink component carriers the channel state information is supposed to be generated for.

(i) In addition, the mobile station apparatus in the mobile communication system in which a base station apparatus and a mobile station apparatus communicate with each other using a plurality of component carriers configured by a base station apparatus is characterized in having a receiver which receives, from the base station apparatus, downlink control information indicating which one of a plurality of downlink component carriers the channel state information is supposed to be generated for, and a generator which generates channel state information for a downlink component carrier, according to the downlink control information.

(j) In addition, the mobile station apparatus in the mobile communication system in which a base station apparatus and a mobile station apparatus communicate with each other using a plurality of component carriers configured by a base station apparatus is characterized in having a generator which generates channel state information for a downlink component carrier, according to the downlink control carrier in which the downlink control information has been detected.

(k) In addition, the mobile station apparatus in the mobile communication system in which a base station apparatus and a mobile station apparatus communicate with each other using a plurality of component carriers configured by a base station apparatus is characterized in having a generator which generates channel state information for a downlink component carrier, according to the search space in which the downlink control information has been detected.

(l) In addition, the mobile station apparatus in the mobile communication system in which a base station apparatus and a mobile station apparatus communicate with each other using a plurality of component carriers configured by a base station apparatus is characterized in having a receiver which receives, from the base station apparatus, downlink control information by which an uplink transmission resource is assigned, and a generator which generates channel state information for a downlink component carrier, according to the downlink control information.

(m) In addition, the mobile station apparatus in the mobile communication system in which a base station apparatus and a mobile station apparatus communicate with each other using a plurality of component carriers configured by a base station apparatus is characterized in having a receiver which receives, from the base station apparatus, downlink control information indicating an uplink component carrier in which the uplink transmission resource assigned by the base station apparatus is supposed to be allocated, and a generator which generates channel state information for a downlink component carrier, according to the downlink control information.

(n) In addition, the mobile station apparatus in the mobile communication system in which a base station apparatus and a mobile station apparatus communicate with each other using a plurality of component carriers configured by a base station apparatus is characterized in having a receiver which receives, from the base station apparatus, downlink control information with a predetermined first field thereof set to a predetermined value, and a unit of changing the interpretation for a predetermined second field, according to the predetermined value which has been set to the predetermined first field of the downlink control information, and generating channel state information for a downlink component carrier.

(o) In addition, the mobile station apparatus in the mobile communication system in which a base station apparatus and a mobile station apparatus communicate with each other using a plurality of component carriers configured by a base station apparatus is characterized in having a receiver which receives, from the base station apparatus, downlink control information with a predetermined first field thereof set to a predetermined value, and a unit of changing the interpretation for a predetermined second field, according to the predetermined value which has been set to the predetermined first field of the downlink control information, and generating channel state information for a plurality of downlink component carriers.

(p) In addition, a communication method of an embodiment of the present invention is a communication method of a base station apparatus in a mobile communication system in which a base station apparatus and a mobile station apparatus communicate with each other using a plurality of component carriers configured by a base station apparatus, characterized in notifying the mobile station apparatus of downlink control information indicating which one of a plurality of downlink component carriers the channel state information is supposed to be generated for.

(q) In addition, a communication method of an embodiment of the present invention is a communication method of a mobile station apparatus in a mobile communication system in which a base station apparatus and a mobile station apparatus communicate with each other using a plurality of component carriers configured by a base station apparatus, characterized in receiving, from the base station apparatus, downlink control information indicating which one of a plurality of downlink component carriers the channel state information is supposed to be generated for, and generating channel state information for a downlink component carrier, according to the downlink control information.

(r) In addition, a communication method of an embodiment of the present invention is a communication method of a mobile station apparatus in a mobile communication system in which a base station apparatus and a mobile station apparatus communicate with each other using a plurality of component carriers configured by a base station apparatus, characterized in generating channel state information for a downlink component carrier, according to the downlink control carrier in which the downlink control information has been detected.

(s) In addition, a communication method of an embodiment of the present invention is a communication method of a mobile station apparatus in a mobile communication system in which a base station apparatus and a mobile station apparatus communicate with each other using a plurality of component carriers configured by a base station apparatus, characterized in generating channel state information for a downlink component carrier, according to the search space in which the downlink control information has been detected.

(t) In addition, a communication method of an embodiment of the present invention is a communication method of a mobile station apparatus in a mobile communication system in which a base station apparatus and a mobile station apparatus communicate with each other using a plurality of component carriers configured by a base station apparatus, characterized in receiving, from the base station apparatus, downlink control information by which an uplink transmission resource is assigned, and generating channel state information for a downlink component carrier, according to the downlink control information.

(u) In addition, a communication method of an embodiment of the present invention is a communication method of a mobile station apparatus in a mobile communication system in which a base station apparatus and a mobile station apparatus communicate with each other using a plurality of component carriers configured by a base station apparatus, characterized in receiving, from the base station apparatus, downlink control information indicating an uplink component carrier in which the uplink transmission resource assigned by the base station apparatus is supposed to be allocated, and generating channel state information for a downlink component carrier, according to the downlink control information.

(v) In addition, a communication method of an embodiment of the present invention is a communication method of a mobile station apparatus in a mobile communication system in which a base station apparatus and a mobile station apparatus communicate with each other using a plurality of component carriers configured by a base station apparatus, characterized in receiving, from the base station apparatus, downlink control information with a predetermined first field thereof set to a predetermined value, changing the interpretation for a predetermined second field, according to the predetermined value which has been set to the predetermined first field of the downlink control information, and generating channel state information for a downlink component carrier.

(w) In addition, a communication method of an embodiment of the present invention is a communication method of a mobile station apparatus in a mobile communication system in which a base station apparatus and a mobile station apparatus communicate with each other using a plurality of component carriers configured by a base station apparatus, characterized in receiving, from the base station apparatus, downlink control information with a predetermined first field thereof set to a predetermined value, changing the interpretation for a predetermined second field, according to the predetermined value which has been set to the predetermined first field of the downlink control information, and generating channel state information for a downlink component carrier.

The program which operates on the base station apparatus 101 and the mobile station apparatus 102 according to the present invention may be a program which controls the CPU or the like to implement the functions of the above-mentioned embodiments according to the present invention (a program which causes the computer to function). The information handled in such devices may be temporarily accumulated in a RAM at the time of processing, subsequently stored in a variety of ROMs or HDDs, and read, modified, or written by the CPU as necessary. The recording media for storing the program may be any of semiconductor media (e.g., ROM, nonvolatile memory card, etc.), optical recording media (e.g., DVD, MO, MD, CD, BD), magnetic storage media (e.g., magnetic tape, flexible disk, etc.), or the like. In addition, not only implementing the functions of the above-mentioned embodiments by executing the loaded program, but also the functions of the present invention may be implemented, based on instructions of the program, by cooperative processing with the operating system or other application programs.

For distribution in the market, the program may be distributed in a manner stored in a portable recording medium, or transferred to a server computer connected via a network such as the Internet. In this case, the storage device of the server computer is also included in the present invention.

In addition, a part or all of the base station apparatus 101 and the mobile station apparatus 102 in the above-mentioned embodiment may be implemented as an LSI, which is typically an integrated circuit. Each function block of the base station apparatus 101 and the mobile station apparatus 102 may be individually fabricated as a chip, or a part of all of may be integrated and fabricated as a chip. In addition, the technique of fabricating an integrated circuit, without being limited to an LSI, may be realized by a dedicated circuit or a general-purpose processor. In addition, if a technique of fabricating integrated circuits replacing the LSI appears owing to the progress of semiconductor technology, an integrated circuit according to the technology may be used.

Although embodiments of the invention have been described in detail above referring to the drawings, specific configurations are not limited to the embodiments, and designs modified in a range not deviating from the scope of the invention are also included therein. The present invention can be preferably used for a radio base station apparatus, a radio mobile station apparatus 102, a radio communication system, and a radio communication method.

DESCRIPTION OF SYMBOLS 101 base station apparatus
102 mobile station apparatus
103 downlink control information
104 uplink transmission signal
1601 higher layer
1602 scheduling unit
1603 transmitting unit
1604 receiving unit
1605 antenna unit
1606 CC control unit
1607 uplink control information control unit
1608 uplink transmission resource information control unit
1609 downlink control channel control unit
1610 mapping unit
1611 radio transmitting unit
1612 radio receiving unit
1613 demapping unit
1614 demodulation unit
1615 decoding unit
1701 higher layer
1702 scheduling information management unit
1703 receiving unit
1704 transmitting unit
1705 antenna unit
1706 CC management unit
1707 radio receiving unit
1708 demapping unit
1709 reference signal measurement unit
1710 downlink control channel management district
1711 uplink control information generation unit
1712 uplink transmission resource information management unit
1713 coding unit
1714 modulation unit
1715 mapping unit
1716 radio transmitting unit
2001 base station apparatus
2002 mobile station apparatus
2003 downlink control information
2004 uplink transmission signal

The invention claimed is:
1. Mobile station apparatus configured to communicate with base station apparatus, the mobile station apparatus comprising:
receiving circuitry configured to:
receive on a plurality of downlink component carriers;
receive a radio resource control signal including first information indicating that a first downlink component carrier of the plurality of downlink component carriers is linked to an uplink component carrier; and
receive, via a physical downlink control channel, a downlink control information format including second information requesting a transmission of channel state information, the downlink control information format being used for scheduling of a physical uplink shared channel on the uplink component carrier; and
transmitting circuitry configured to:
in a case that the downlink control information format including the second information requesting the transmission of the channel state information is received, transmit, in a subframe, via the physical uplink shared channel on the uplink component carrier, channel state information for the first downlink component carrier based on the first information.

2. Base station apparatus configured to communicate with mobile station apparatus, the base station apparatus comprising:

transmitting circuitry configured to:
 transmit on a plurality of downlink component carriers;
 transmit a radio resource control signal including first information indicating that a first downlink component carrier of the plurality of downlink component carriers is linked to an uplink component carrier; and
 after the first information is transmitted, transmit, via a physical downlink control channel, a downlink control information format including second information requesting a transmission of channel state information, the downlink control information format being used for scheduling a physical uplink shared channel on the uplink component carrier; and receiving circuitry configured to:
 in a case that the downlink control information format including the second information requesting the transmission of the channel state information is transmitted, receive, in a subframe, via the physical uplink shared channel on the uplink component carrier, channel state information for the first downlink component carrier.

3. A communication method of mobile station apparatus configured to communicate with base station apparatus, the communication method comprising:

receiving on a plurality of downlink component carriers;
receiving a radio resource control signal including first information indicating that a first downlink component carrier of the plurality of downlink component carriers is linked to an uplink component carrier;
receiving, via a physical downlink control channel, a downlink control information format including second information requesting a transmission of channel state information, the downlink control information format being used for scheduling of a physical uplink shared channel on the uplink component carrier; and
in a case that the downlink control information format including the second information requesting the transmission of the channel state information is received, transmitting, in a subframe, via the physical uplink shared channel on the uplink component carrier, channel state information for the first downlink component carrier based on the first information.

4. A communication method of base station apparatus configured to communicate with mobile station apparatus, the communication method comprising:

transmitting a plurality of downlink component carriers;
transmit a radio resource control signal including first information indicating that a first downlink component carrier of the plurality of downlink component carriers is linked to an uplink component carrier;
after the first information is transmitted, transmitting, via a physical downlink control channel, a downlink control information format including second information requesting a transmission of channel state information, the downlink control information format being used for scheduling of a physical uplink shared channel on the uplink component carrier; and
in a case that the downlink control information format including the second information requesting the transmission of the channel state information is transmitted, receiving, in a subframe, via the physical uplink shared channel on the uplink component carrier, channel state information for the first downlink component carrier.

* * * * *